United States Patent
Lei et al.

(10) Patent No.: US 12,052,768 B2
(45) Date of Patent: *Jul. 30, 2024

(54) METHODS AND APPARATUS FOR INDICATING AND SWITCHING UE CAPABILITIES

(71) Applicant: QUALCOMM Incorporated, San Diego, CA (US)

(72) Inventors: Jing Lei, San Diego, CA (US); Linhai He, San Diego, CA (US); Peter Pui Lok Ang, San Diego, CA (US); Huilin Xu, Temecula, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,506

(22) Filed: Apr. 6, 2023

(65) Prior Publication Data

US 2023/0371082 A1 Nov. 16, 2023

Related U.S. Application Data

(63) Continuation of application No. 17/125,893, filed on Dec. 17, 2020, now Pat. No. 11,653,389.

(Continued)

(51) Int. Cl.
*H04W 74/08* (2024.01)
*H04B 1/713* (2011.01)
(Continued)

(52) U.S. Cl.
CPC ........ *H04W 74/0833* (2013.01); *H04B 1/713* (2013.01); *H04B 17/318* (2015.01);
(Continued)

(58) Field of Classification Search
CPC ........... H04W 74/0833; H04W 56/001; H04W 72/0413; H04W 74/008; H04W 76/27;
(Continued)

(56) References Cited

U.S. PATENT DOCUMENTS 10,727,961 B2 7/2020 Hwang et al.
11,375,527 B1 * 6/2022 Eyuboglu .......... H04B 7/15528
(Continued)

FOREIGN PATENT DOCUMENTS

CN 110337126 A 10/2019
EP 2214445 A1 8/2010
(Continued)

OTHER PUBLICATIONS

Ericsson: "New SID on Support of Reduced Capability NR Devices", 3GPP TSG RAN Meeting #86, 3GPP Draft, RP-193238, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 12, 2019 (Dec. 12, 2019), 5 Pages, XP051840369, the whole document.

(Continued)

*Primary Examiner* — Fahmida S Chowdhury
(74) *Attorney, Agent, or Firm* — Procopio, Cory, Hargreaves & Savitch LLP

(57) ABSTRACT

The present disclosure relates to methods and devices for wireless communication of an apparatus, e.g., a UE and/or a base station. In one aspect, the apparatus may receive, from a base station, at least one SSB. The apparatus may also determine a RSRP of the at least one SSB. Additionally, the apparatus may transmit, to the base station if the RSRP of all of the at least one SSB is less than a threshold, an indication of a reduced UE capability of the UE during a RACH procedure. The apparatus may also transmit, to the base (Continued)

station if the RSRP of one of the at least one SSB is greater than or equal to the threshold, the indication of the reduced UE capability of the UE after entering into a RRC connected state upon completion of the RACH procedure.

30 Claims, 9 Drawing Sheets

Related U.S. Application Data

(60) Provisional application No. 62/952,195, filed on Dec. 20, 2019.

(51) Int. Cl.
| | | |
|---|---|---|
| *H04B 17/318* | (2015.01) | |
| *H04L 1/1607* | (2023.01) | |
| *H04L 5/00* | (2006.01) | |
| *H04W 56/00* | (2009.01) | |
| *H04W 72/21* | (2023.01) | |
| *H04W 74/00* | (2009.01) | |
| *H04W 74/0833* | (2024.01) | |
| *H04W 76/27* | (2018.01) | |
| *H04W 80/02* | (2009.01) | |

(52) U.S. Cl.
CPC .......... *H04L 1/1664* (2013.01); *H04L 5/0051* (2013.01); *H04L 5/0055* (2013.01); *H04W 56/001* (2013.01); *H04W 72/21* (2023.01); *H04W 74/008* (2013.01); *H04W 76/27* (2018.02); *H04W 80/02* (2013.01)

(58) Field of Classification Search
CPC ..... H04B 1/713; H04B 17/318; H04L 1/1664; H04L 5/0051
See application file for complete search history.

(56) References Cited

U.S. PATENT DOCUMENTS

| | | |
|---|---|---|
| 2014/0098756 A1 | 4/2014 | Tabatabaei Yazdi et al. |
| 2016/0345217 A1 | 11/2016 | Tabet et al. |
| 2018/0097599 A1* | 4/2018 | Lee ................... H04W 72/23 |
| 2018/0116000 A1* | 4/2018 | Ly .................... H04W 74/006 |
| 2018/0132282 A1 | 5/2018 | Ly et al. |
| 2019/0110300 A1* | 4/2019 | Chen ................. H04W 74/02 |
| 2019/0230499 A1* | 7/2019 | Sun .................... H04W 24/08 |
| 2019/0306923 A1 | 10/2019 | Xiong et al. |
| 2020/0107235 A1* | 4/2020 | Peisa ................. H04W 76/11 |
| 2020/0252822 A1* | 8/2020 | Kim ................... H04W 76/15 |
| 2020/0314916 A1 | 10/2020 | Park et al. |
| 2020/0396654 A1* | 12/2020 | Freda ................ H04W 36/06 |
| 2021/0051707 A1* | 2/2021 | Rastegardoost ...... H04L 5/0051 |
| 2021/0058971 A1* | 2/2021 | MolavianJazi ....... H04L 5/0044 |
| 2021/0144703 A1* | 5/2021 | Jung ................... H04B 7/0408 |
| 2021/0195654 A1 | 6/2021 | Lei et al. |
| 2022/0015047 A1* | 1/2022 | Ryu ................... H04W 56/0015 |
| 2022/0167432 A1* | 5/2022 | Lee .................... H04W 74/002 |
| 2022/0217781 A1* | 7/2022 | Decarreau ............... G06N 3/08 |
| 2022/0225256 A1* | 7/2022 | Jung .................... H04L 5/005 |

FOREIGN PATENT DOCUMENTS

| | | |
|---|---|---|
| KR | 20100091873 A | 8/2010 |
| TW | 201924456 A | 6/2019 |

OTHER PUBLICATIONS

Huawei et al., "Signalling Introduction of SRS Switching Capability", RP-182838, 3GPP TSG-RAN Meeting #82, Sorrento, Italy, Dec. 10-13, 2018, 10 Pages.
International Preliminary Report on Patentability—PCT/US2020/066214 The International Bureau of WIPO—Geneva, Switzerland, Jun. 30, 2022.
International Search Report and Written Opinion—PCT/US2020/066214—ISA/EPO—Apr. 20, 2021.
Taiwan Search Report—TW109144971—TIPO—May 29, 2024.
ZTE: "Consideration on supporting lower UE power class in efeMTC", 3GPP TSG-RAN WG2 Meeting#99, R2-1708378, Berlin, Germany, Aug. 21-25, 2017, 20 Pages.

* cited by examiner

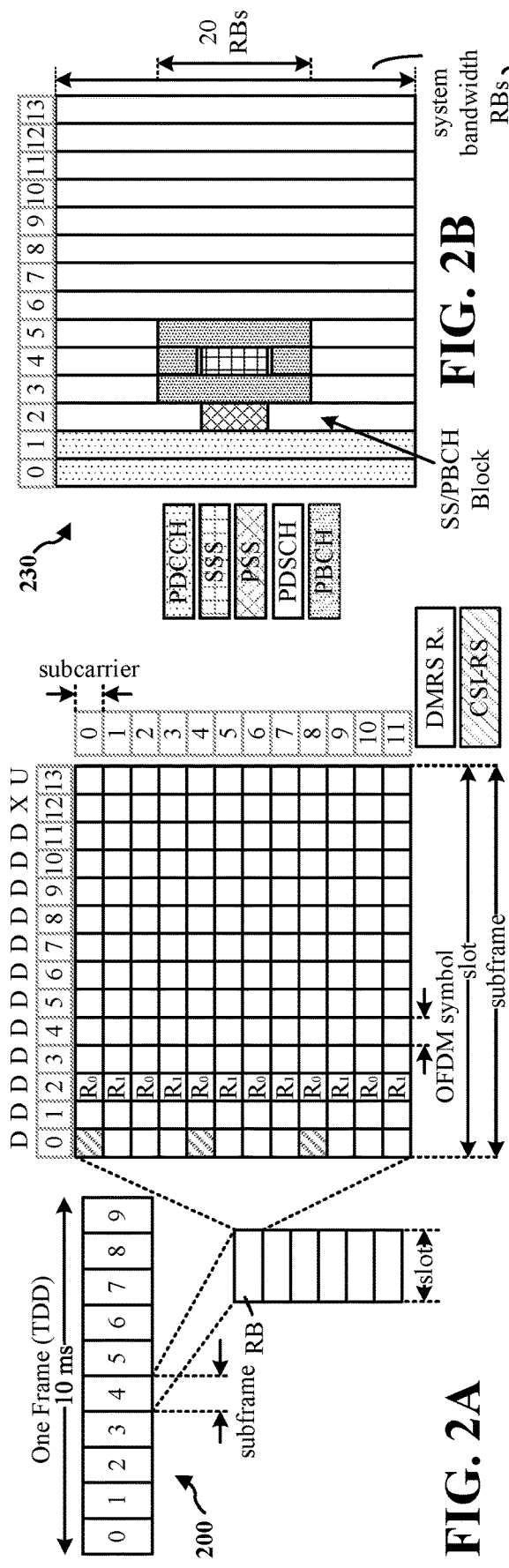
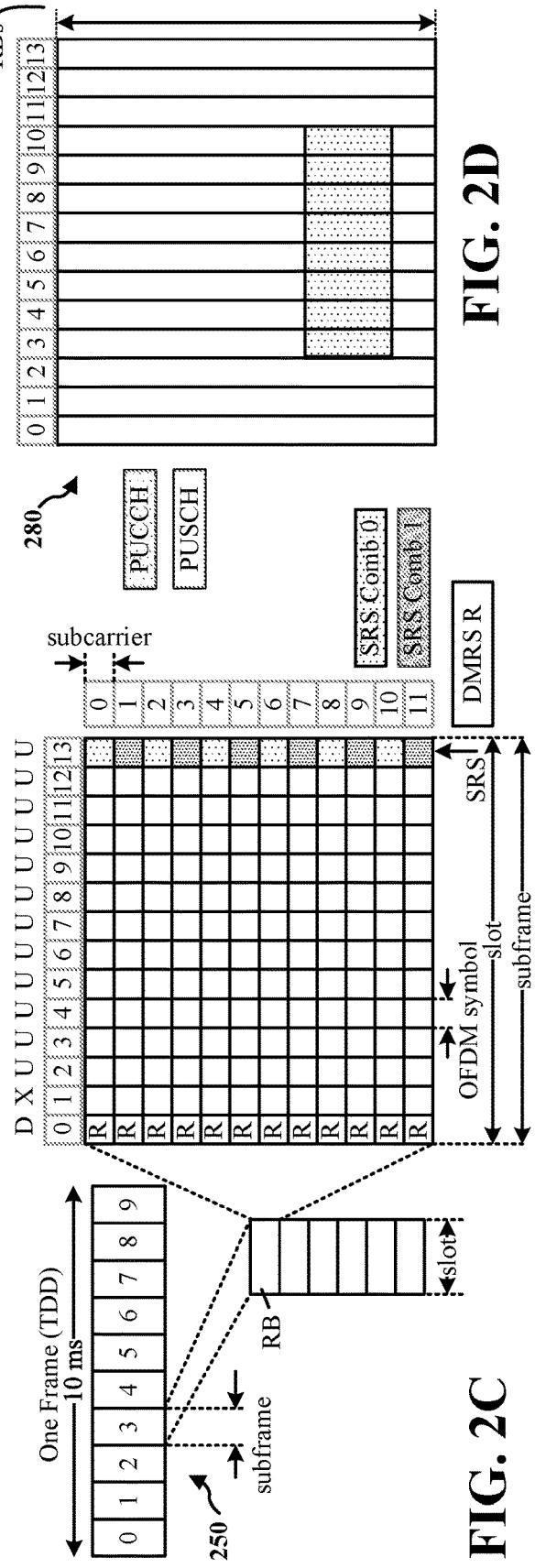
FIG. 2A
FIG. 2B
FIG. 2C
FIG. 2D

METHODS AND APPARATUS FOR INDICATING AND SWITCHING UE CAPABILITIES

This application is a continuation of U.S. Non-Provisional application Ser. No. 17/125,893, entitled "METHODS AND APPARATUS FOR INDICATING AND SWITCHING UE CAPABILITIES" and filed on Dec. 17, 2020, which claims the benefit of U.S. Provisional Application Ser. No. 62/952,195, entitled "METHODS AND APPARATUS FOR INDICATING AND SWITCHING UE CAPABILITIES" and filed on Dec. 20, 2019, which are expressly incorporated by reference herein in its entirety.

BACKGROUND

Technical Field

The present disclosure relates generally to communication systems, and more particularly, to methods and apparatus related to user equipment (UE) capabilities in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). In some aspects, the apparatus may receive, from a base station, at least one synchronization signal block (SSB). The apparatus may also determine a reference signal received power (RSRP) of the at least one SSB. Additionally, the apparatus may transmit, to the base station if the RSRP of all of the at least one SSB is less than a threshold, an indication of a reduced UE capability of the UE during a random access channel (RACH) procedure, the threshold being configured by the base station. The apparatus may also transmit, to the base station if the RSRP of one of the at least one SSB is greater than or equal to the threshold, the indication of the reduced UE capability of the UE after entering into a radio resource control (RRC) connected state upon completion of the RACH procedure.

In an aspect of the disclosure, a method, a computer-readable medium, and an apparatus are provided. The apparatus may be a base station. In some aspects, the apparatus may transmit, to a UE, at least one synchronization signal block (SSB). The apparatus may also receive, from the UE, an indication of a reduced UE capability of the UE during a random access channel (RACH) procedure or after entering into a radio resource control (RRC) connected state upon completion of the RACH procedure, the indication of the reduced UE capability being based on a threshold associated with a reference signal received power (RSRP) of the at least one SSB, the threshold being configured by the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
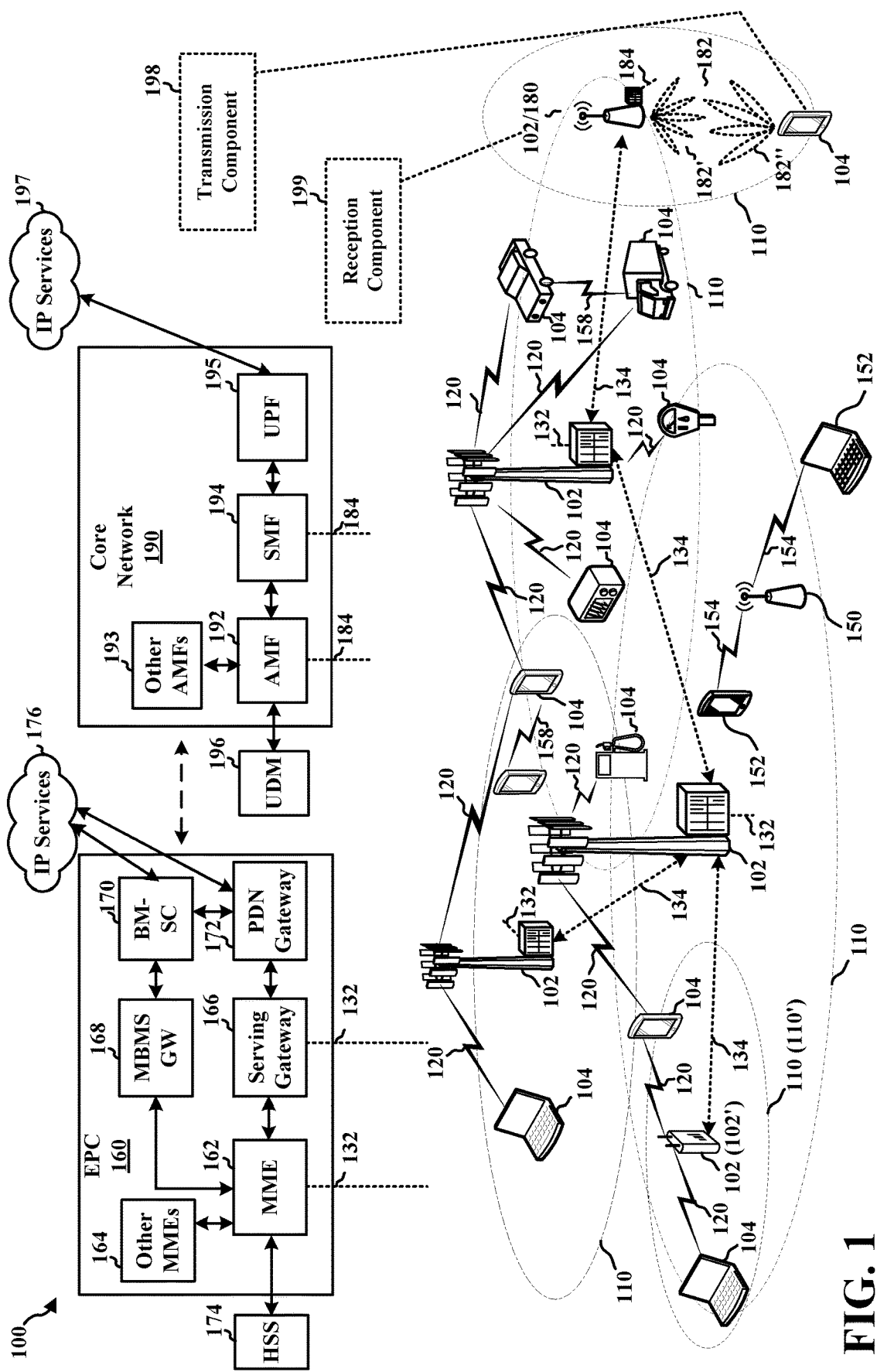
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a transmission component 198 configured to receive, from a base station, at least one synchronization signal block (SSB). Transmission component 198 may also be configured to determine a reference signal received power (RSRP) of the at least one SSB. Transmission component 198 may also be configured to transmit, to the base station if the RSRP of the at least one SSB is less than a threshold, an indication of a UE capability of the UE during a random access channel (RACH) procedure. Transmission component 198 may also be configured to transmit, to the base station if the RSRP of the at least one SSB is greater than or equal to the threshold, the indication of the UE capability of the UE after entering into a radio resource control (RRC) connected state upon completion of the RACH procedure.

Referring again to FIG. 1, in certain aspects, the base station 180 may include a reception component 199 configured to transmit, to a user equipment (UE), at least one synchronization signal block (SSB). Reception component 199 may also be configured to receive, from the UE, an indication of a UE capability of the UE during a random access channel (RACH) procedure or after entering into a radio resource control (RRC) connected state upon completion of the RACH procedure, the indication of the UE capability being based on a threshold associated with a reference signal received power (RSRP) of the at least one SSB.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
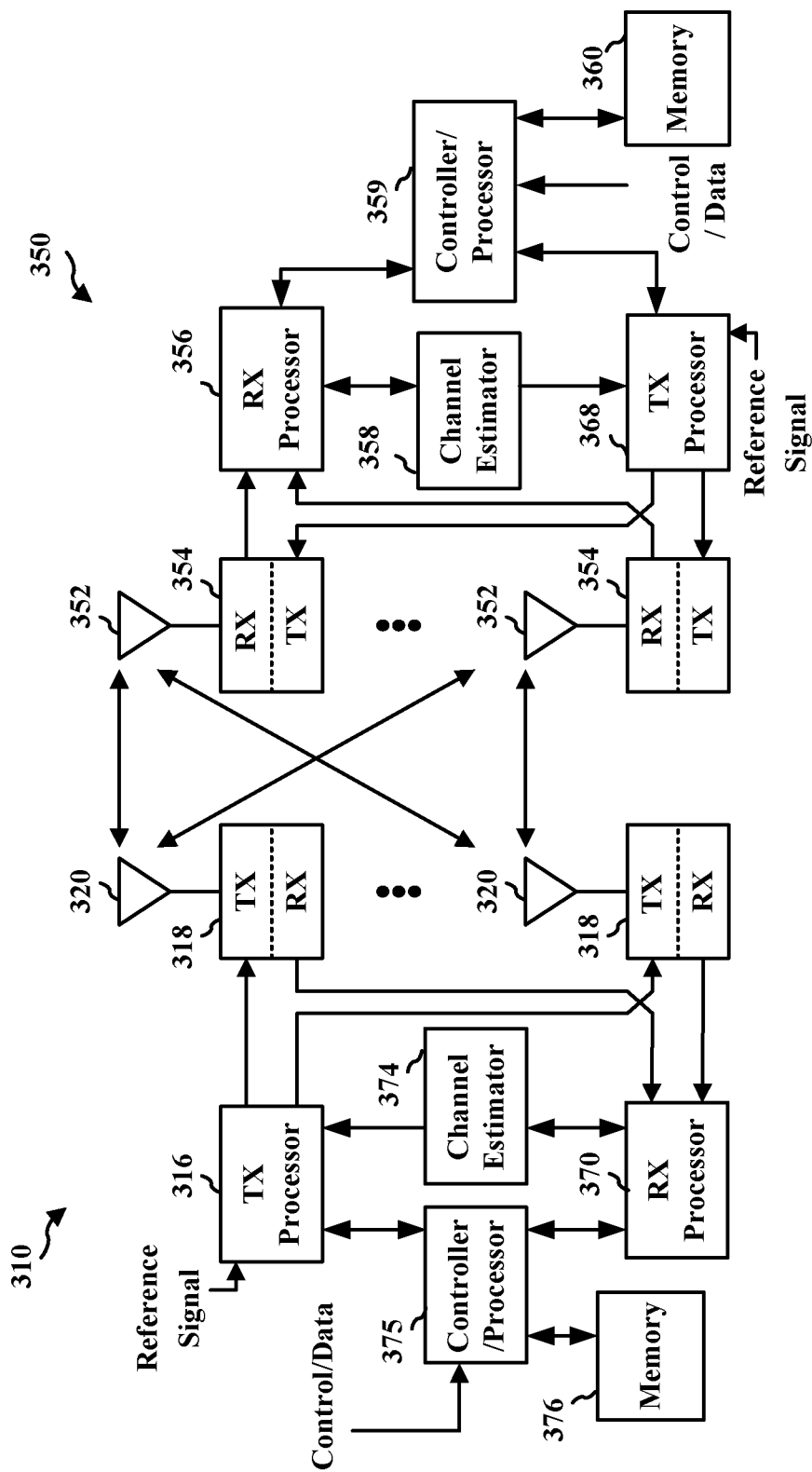
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some aspects of wireless communication, capabilities of a UE can be signaled to a base station at a certain time, e.g., after an RRC connection. For instance, during the uplink transmission of an initial access procedure, e.g., a RACH procedure, a number of different capabilities may not yet be configured. For example, a PUSCH slot repetition, inter-slot frequency hopping, π/2 binary phase shift keying (BPSK) modulation, low spectral efficiency (SE) modulation and coding scheme (MCS) tables, and/or multiple demodulation reference signal (DMRS) symbols may not be configured during the uplink transmission of an initial access procedure. Accordingly, in some aspects, during an initial access state, a base station may not be aware of certain capabilities of a UE.

The aforementioned UE capability signaling may be undesirable for coverage enhancements of certain UEs, e.g., cell-edge UEs, or relaxation of UE processing time and capabilities during an initial access procedure. For instance, based on the aforementioned UE capability signaling, UEs may be restricted to apply certain transmission or reception schemes that are independent of their UE capabilities. As such, a UE may not include a transmission or reception scheme that is best suited to its own capabilities. This can result in UE performance that is less than ideal. Based on this, there is a present need for early UE capability signaling that is adjustable based on the particular UE capabilities or the processing timeline of the initial access procedure.

For certain types of UEs with reduced capabilities, such as reduced capability (redcap) UEs or low/medium tier UEs, implicit or early indication and/or flexible switching of UE capabilities may be utilized. For instance, implicit or early indication and/or flexible switching of UE capabilities may be utilized to support coverage recovery, access control, and power savings for RRC idle or inactive states. In some aspects, UE capabilities can include at least one of bandwidth capability, transmit (Tx) or receive (Rx) antenna number, full-duplex or half-duplex FDD, power class, or a UE processing speed or timeline. For instance, a reduction in UE's capability can include bandwidth reduction, Tx or Rx antenna number reduction, half-duplex FDD, power class reduction, and/or a relaxation of a UE processing timeline or capability.

In some aspects, information related to a capability of a UE, i.e., UE capability information, can be organized as a data structure including multiple information elements (IEs). Also, each IE can be mapped to one set of UE features associated with corresponding UE capabilities, which can be used by a base station for scheduling. In some instances, in order to support the features associated with reduced UE capabilities, IEs can be added to the UE capability information. Further, a UE capability report, e.g., based on full or partial reporting, can be sent by a UE in number of different ways. For example, an implicit indication of reduced UE capabilities can occur before an RRC connection. In this case, a UE can communicate one or more IEs to a base station through the use of a RACH procedure, e.g., a two-step (2-step) or a four-step (4-step) RACH. In some aspects, a network can leverage an early indication to enhance the performance of a UE, e.g., a UE in an idle or inactive state, such as to improve coverage enhancement, access control, and/or power savings. Also, to reduce the signaling overhead of UE reporting, a UE may report a few features, rather than a full list of UE capability information.

In some aspects, UE reporting of reduced capabilities can occur after an RRC connection. For instance, a base station may send an inquiry to a UE. Upon receiving the inquiry, the UE may report or passively report its capability information. In some instances, switching a UE's capability can be initiated by the UE after the RRC connection, or may be instructed by the base station. Additionally, a mask can be introduced to the data structure of the UE capability information. Based on this mask, a base station may control the time and duration of the temporary switch, as well as which subset of UE capabilities are switched.

In some aspects, the co-existence of different UE capabilities may need to be addressed in a number of different RRC states. To compensate for the reduction of UE capabilities without compromising uplink coverage, a number of different features may be considered for reduced capability (redcap) UEs or light UEs. For example, slot repetition, inter-slot frequency hopping, π/2 BPSK modulation, payload size scaling, and low SE MCS tables may be considered for reduced capability or light UEs. For instance, these features may be considered for reduced capability UEs in order to support the same uplink coverage as premium UEs.

Moreover, one or more IEs for a reduced UE capability may include a number of the aforementioned features for coverage enhancement or power savings. For instance, these IE features can include support for: a low SE MCS table, PUSCH slot repetitions with self-decodable redundancy versions (RVs), PUCCH repetitions on a symbol or slot level, inter-slot frequency hopping of a channel (e.g., PUCCH, PUSCH, or PRACH), low peak-to-average power ratio (PAPR) modulation (e.g., π/2 BPSK modulation, low PAPR DMRS, or DFT-s-OFDM waveforms), low PAPR waveforms (e.g., PUCCH or PUSCH formats for non-coherent communication without DMRS), uplink DMRS bundling, reduced PDCCH monitoring within an extended random access response (RAR) window, and/or small data transfers for low mobility or stationary UEs based on a RACH or pre-configured uplink resources.

Some types of UEs, e.g., premium UEs, may benefit from adjusting or reducing their UE capabilities. In some instances, a temporary reduction of UE capabilities may provide an extra mode of power savings for premium UEs. For instance, as premium UEs may not always utilize their entire bandwidth, a corresponding reduction in UE capabilities may help to save power at the UE. Accordingly, it may be beneficial for UEs to indicate a reduction in UE capability in order to reduce the amount of power utilized.

Aspects of the present disclosure can include an implicit indication of reduced UE capabilities for reduced capability (redcap) UEs or light UEs. This implicit indication of reduced UE capabilities may occur at a certain time period, e.g., prior to an RRC connection. By doing so, this reduction in UE capabilities can provide a coverage enhancement for redcap or light UEs during an initial access procedure. Also, a reduced UE capability reporting, e.g., before or after an RRC connection, can reduce the signaling overhead for redcap or light UEs. Moreover, aspects of the present disclosure can also switch UE capabilities for certain UEs, e.g., premium UEs, after an RRC connection. One motivation for this UE capability switch can be to facilitate power savings at the UE. Switching the UE capability can also allow for a different quality of service (QoS) class, such as with a higher efficiency of resource utilization.

Aspects of the present disclosure can include a number of different ways to facilitate the implicit indication and/or flexible switching of UE capabilities. For example, aspects of the present disclosure can partition RACH resources in time, frequency, or code domains. Additionally, aspects of the present disclosure can transmit specially configured reference signals or channels, including a physical RACH (PRACH), a PUSCH, DMRS, SRS, or a PUCCH. Aspects of the present disclosure can also include a MAC control element (MAC-CE) in a message A (msgA) payload of a 2-step RACH. Also, in a 4-step RACH, the MAC-CE can be included in a message 1 (msg1), a message 3 (msg3), or a message 5 (msg5). Further, the present disclosure can include a PUCCH or UCI multiplexed with a PUSCH. The aforementioned features can include a number of different benefits or advantages, such as assisting with more efficient resource utilization and/or the co-existence of multiple UE categories.

Aspects of the present disclosure can also include a variety of UE features for reduced capability (redcap) or light UEs. In order to compensate for a reduction in UE capabilities without compromising uplink coverage, several UE features can be utilized by redcap or light UEs. These UE features can be associated with, or indicated via, a number of different uplink channels. Also, as uplink coverage is related to UE transmission, and the UE capability reduction may have a direct impact on the uplink coverage and other aspects such as UE power savings and co-existence.

In some aspects, the aforementioned UE features can be associated with, or indicated via, a PUSCH. For example, these UE features can include slot repetition with self-decodable redundancy version (RV) combinations, inter-slot frequency hopping, $\pi/2$ BPSK modulation, low SE MCS tables, and/or a UCI piggyback pattern. Also, a number of UE features can be associated with, or indicated via, a DMRS, such as a new waveform based on lower peak-to-average power ratio (PAPR) sequences, multiple scrambling identifiers (IDs) per antenna port, group hopping or sequence hopping of DMRS sequences, and/or multiple DMRS symbols with an extended orthogonal cover code (OCC) or a configurable bundling size. For example, if a UE transmits via a reduced power, the base station may need multiple copies of DMRS symbols, a PRACH, a PUSCH, and a PUCCH.

Further, the aforementioned UE features can be associated with, or indicated via, a PUCCH, which can include PUCCH repetition, frequency hopping and a new waveform for coverage enhancement, supporting common and separately configured PUCCH formats, and/or channel state information (CSI) reporting with a reduced granularity or an increased number of cyclic redundancy check (CRC) bits. In some aspects, a separate configuration can include a PUCCH with an extended OCC, increased repetition levels, and/or frequency hops. Additionally, the aforementioned UE features can be associated with, or indicated via, a PRACH, which can include supporting a shared RACH occasion (RO) and a dedicated RO, where a dedicated RO can be configured with a reduced bandwidth or subcarrier spacing (SCS), time domain OCC, increased repetition levels, and/or frequency hops. UE features associated with, or indicated via, a PRACH can also include supporting different SCS or PRACH formats on ROs that are separately configured for reduced capability or light UEs.

Aspects of the present disclosure can also simplify one or more physical layer (PHY) procedures. For instance, aspects of the present disclosure can separately configure RRC parameters for power control of a PRACH, a PUSCH, SRS, or a PUCCH. Aspects of the present disclosure can also utilize the aforementioned features in stand-alone (SA) mode and/or single connectivity. Further, aspects of the present disclosure can simplify beam management. Aspects of the present disclosure can also reduce the monitoring of a PDCCH within a random access response (RAR) window and relax the PDCCH processing time, e.g., a message 2 (msg2) in a 4-step RACH or message B (msgB) in a 2-step RACH, or a contention resolution timer, e.g., a message 4 (msg4) in a 4-step RACH. For example, aspects of the present disclosure can defer the starting point of DCI monitoring via a semi-persistently configured slot-level offset, as well as re-designing a Hash function for SS configuration.

Aspects of the present disclosure can also relax a HARQ timeline. For example, this can be implemented by deferring the PUCCH transmission by a semi-persistently configured slot-level offset, which can increase the bit-width of "k", or re-designing the lookup table (LUT) for delta or "A" (e.g., with a timing device). As indicated above, aspects of the present disclosure can include different configurations of PHY procedures, which can be signaled to the UE, and the UE can determine its category of capability prior to the RRC connection. Aspects of the present disclosure can also include an implicit indication of UE capabilities. Based on the RSRP measurement of a synchronization signal block (SSB) and a network configured threshold, a reduced capability or light UE can determine whether to indicate its capability implicitly or explicitly.

Figure 4:
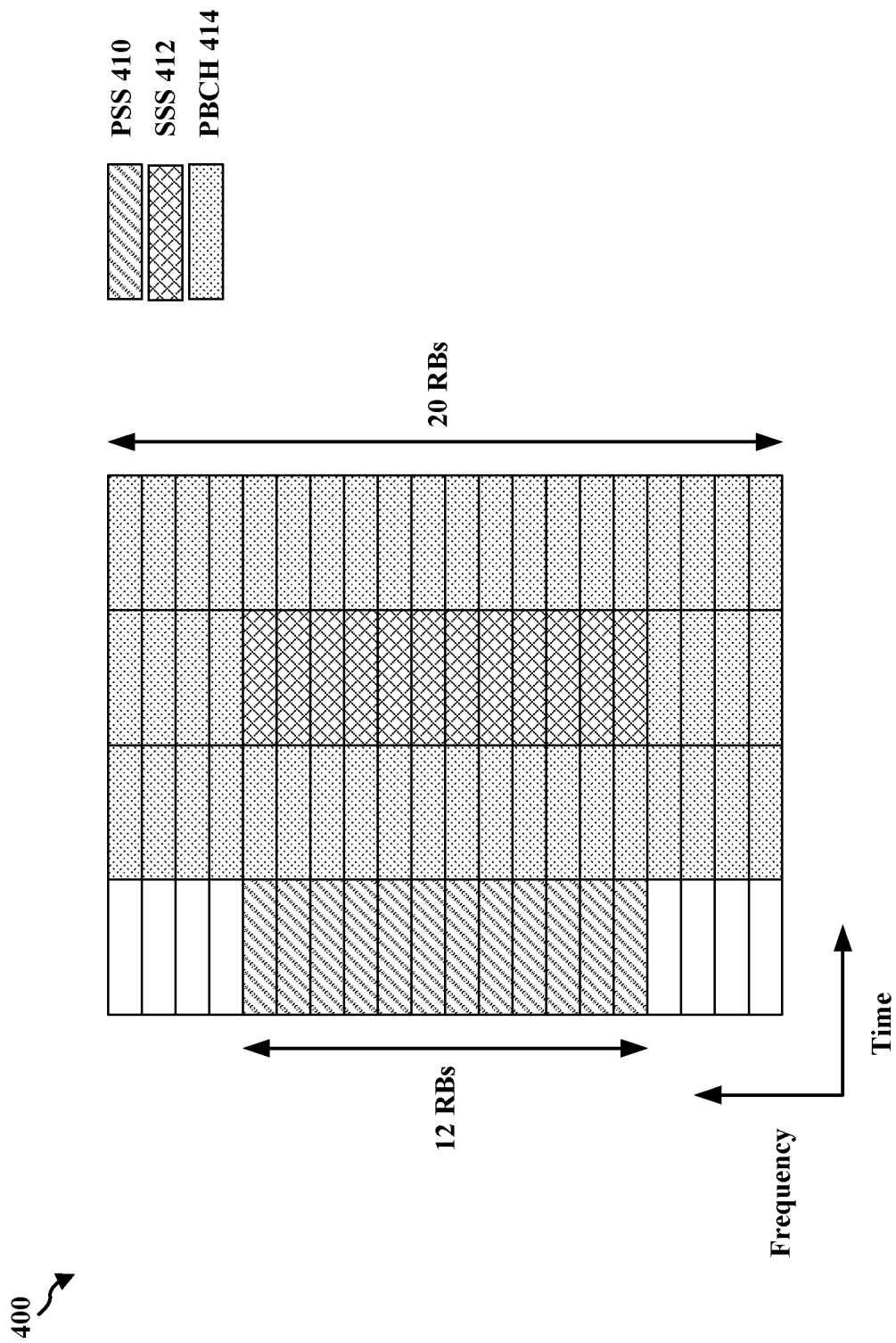
FIG. 4 is a diagram illustrating an example synchronization signal (SS)/physical broadcast channel (PBCH) block.

FIG. 4 is a diagram 400 illustrating an example synchronization signal (SS)/physical broadcast channel (PBCH) block, i.e., an SSB. As shown in FIG. 4, diagram 400 includes a primary synchronization signal (PSS) 410, a secondary synchronization signal (SSS) 412, and a PBCH 414. FIG. 4 depicts that PBCH 414, which carries a MIB, may be grouped with PSS 410 and SSS 412 to form a SS/PBCH block, i.e., an SSB. As illustrated in FIG. 4, the SSB including PSS 410, SSS 412, and PBCH 414 comprises a number of resource blocks (RBs). These resource blocks can span both time and frequency. For instance, PBCH 414 may span 20 RBs in frequency, and the PSS 410 and SSS 412 may span 12 RBs in frequency.

In some aspects, if an SSB-based RSRP measurement is less than a threshold, a reduced capability or light UE can report its capability implicitly during an initial access stage by utilizing one or more options. For instance, a UE can transmit PRACH preambles on RACH occasions dedicated to reduced capability or light UEs. Also, a UE can transmit a msg3, msg5, or a msgA PUSCH with DMRS resources dedicated to reduced capability or light UEs. In some aspects, the DMRS resources can include a DMRS port or DMRS sequences. For example, a UE can select a certain DMRS port or DMRS sequence in order to implicitly indicate the capability of the UE. Further, a UE can map information including a UE capability to a bit level scrambling ID of a PUSCH, a CRC mask of PUSCH, the payload of a msg3 or a msgA PUSCH, e.g., a dedicated MAC header or sub-header and a dedicated MAC sub-PDU format, or a dedicated UCI piggyback pattern.

In some aspects, if an SSB-based RSRP measurement is greater than or equal to a threshold, a reduced capability or light UE can report its capability after an initial access stage. Optionally, a UE can report its capability implicitly prior to an RRC connection in a similar manner compared to when an SSB-based RSRP measurement is less than a threshold. Additionally, in some aspects, after an RRC connection is established, a reduced capability or light UE which has implicitly reported its capability can select a number of different options. In some instances, a UE can waive or skip the reporting of its UE capability. For example, if all the UE capability information has been reported during the initial access period, there may be no need to report any further UE capability information. Also, a UE can refine or reaffirm the reporting of the UE capability.

Aspects of the present disclosure can also include a switch of UE capabilities. For instance, for premium UEs, e.g., UEs equipped with more advanced capabilities than reduced capability or light UEs, a temporary switch to reduced capabilities may help to improve power savings and/or radio resource utilization efficiency. In some instances, a base station can transmit a PDCCH to instruct one or more UEs to reduce their capabilities within a configurable time interval. Further, the DCI can include the UE identifiers and/or the time interval when a capability reduction may take effect. Also, the UE can request a capability reduction within a configurable time interval.

In some aspects, a UE capability switch request can be triggered by a premium UE using a number of different options. For instance, a UE can transmit a single-bit or multi-bit toggling signal or sequence on SRS, a PUCCH, or a PUSCH. For example, a multi-bit signal or sequence may indicate the different capabilities of the UE. Additionally, the UE can perform a 2-step or 4-step RACH procedure, e.g., contention-based random access (CBRA) or contention-free random access (CFRA), and send the request in a msgA of the 2-step RACH, or a msg1, msg3, or msg5 of the 4-step RACH. Moreover, a single bit or multiple bit indication can be transmitted in a 2-step or a 4-step RACH procedure. More specifically, for a 2-step RACH procedure, the indication can be transmitted via a msgA preamble (PRACH) or a msgA payload (PUSCH). Also, for a 4-step RACH procedure, the indication can be transmitted via a msg1 (PRACH), a msg3 (PUSCH), a msg5 (PUSCH), or a PUCCH.

In some instances, the base station can respond to the UE's capability switch request via DCI or a RAR. In some aspects, the base station can transmit an ACK and a capability recheck timer. By doing so, the base station can acknowledge the UE's request, and the UE can be allowed to switch its capability within the time interval given by the timer. For example, if the timer expires, the UE may monitor a PDCCH for the reduced capability response. Additionally, the base station can transmit a NACK to the UE, e.g., to decline the UE's request, such that the UE may not be allowed to switch capabilities. For example, the base station may transmit downlink data to the UE, such that the base station may not allow the UE to switch its capability.

Figure 5:
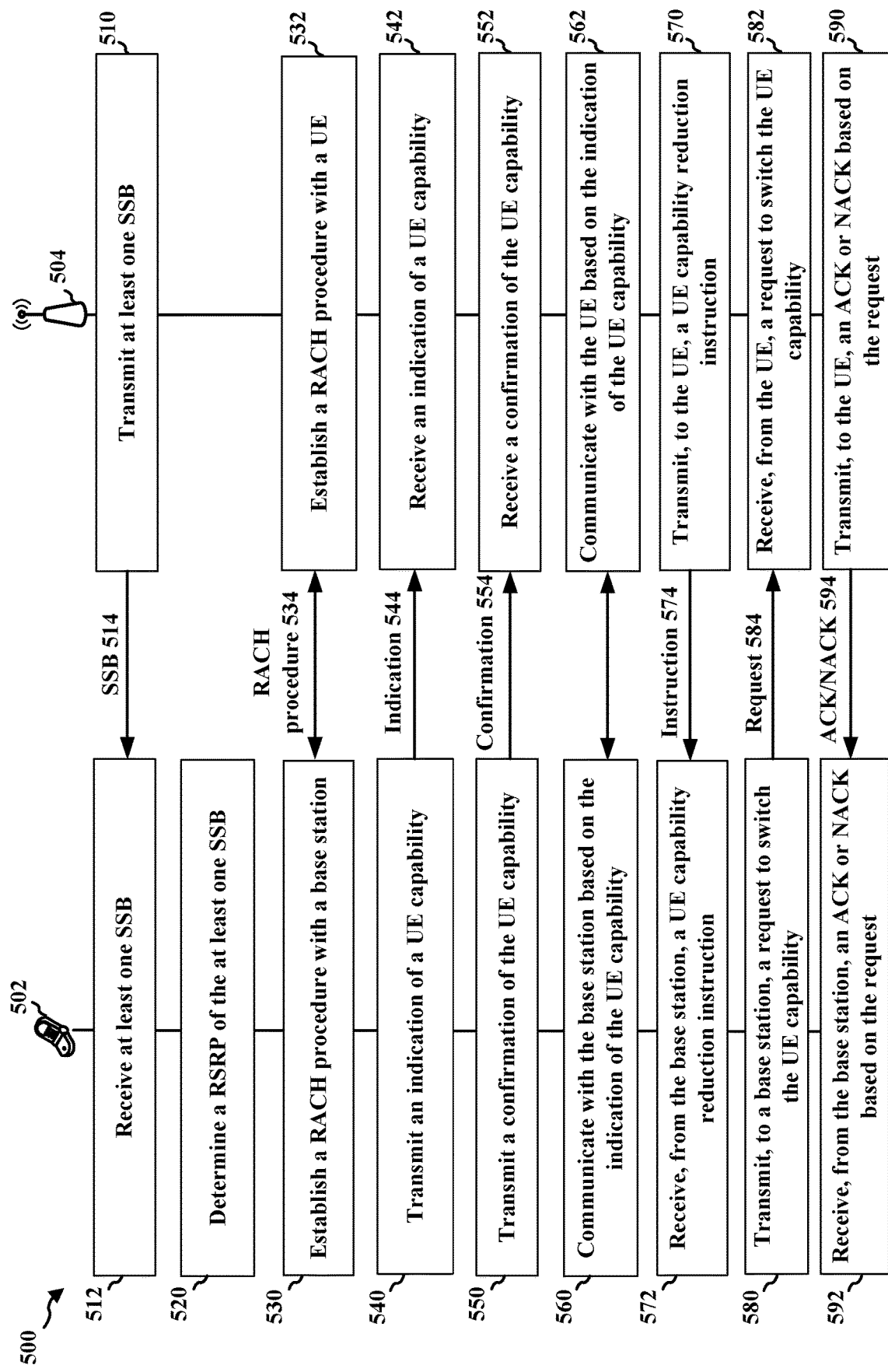
FIG. 5 is a diagram illustrating example communication between a UE and a base station.

FIG. 5 is a diagram 500 illustrating communication between a UE 502 and a base station 504. The UE 502 may correspond to UE 104, 350, and apparatus 802, and the base station 504 may correspond to base station 102/180, 310, and apparatus 902.

At 510, base station 504 may transmit, to UE 502, at least one synchronization signal block (SSB), e.g., SSB 514. At 512, UE 502 may receive, from base station 504, at least one SSB, e.g., SSB 514.

At 520, UE 502 may determine or measure a reference signal received power (RSRP) of the at least one SSB, e.g., SSB 514. In an example, UE 502 may determine whether a reference signal received power (RSRP) of the at least one SSB, e.g., SSB 514, is less than a threshold, the threshold being configured by the base station. In some instances, the threshold may be configured by a base station and received via system information (SI) or radio resource control (RRC) signaling.

At 530, UE 502 may establish a RACH procedure, e.g., RACH procedure 534, with the base station 504. Likewise, at 532, base station 504 may establish the RACH procedure, e.g., RACH procedure 534, with the UE 502.

At 540, UE 502 may transmit, to the base station 504, an indication of a UE capability of the UE, e.g., indication 544. For example, the UE may transmit, to the base station if the RSRP of the at least one SSB, e.g., SSB 514, is less than a threshold, an indication of a UE capability of the UE, e.g., indication 544, during a RACH procedure 534, the threshold being configured by the base station. Also, the UE may transmit, to the base station if the RSRP of the at least one SSB, e.g., SSB 514, is greater than or equal to the threshold, the indication of the UE capability of the UE, e.g., indication 544, after entering into a radio resource control (RRC) connected state upon completion of the RACH procedure 534. At 542, base station 504 may receive, from the UE 502, an indication of a UE capability of the UE, e.g., indication 544, during a RACH procedure or after entering into a RRC connected state upon completion of the RACH procedure, the indication of the UE capability being based on a threshold associated with a reference signal received power (RSRP) of the at least one SSB, e.g., SSB 514.

In some aspects, if the indication of the UE capability is transmitted during the RACH procedure, the indication may correspond to a message A (msgA) physical uplink shared channel (PUSCH) when the RACH procedure is a 2-step RACH procedure, or a message 3 (msg3) and a message 5 (msg5) PUSCH when the RACH procedure is a 4-step RACH procedure. The msgA payload, the msg3, or the msg5 may be transmitted via one or more demodulation reference signal (DMRS) resources associated with reduced capability (redcap) UEs. Further, if the indication of the UE capability is transmitted during the RACH procedure, the indication may correspond to one or more physical RACH (PRACH) preambles on one or more RACH occasions associated with reduced capability (redcap) UEs. The indication of the UE capability may also be transmitted on a msgA preamble or a msg1 during the RACH procedure when the RSRP of the at least one SSB, e.g., SSB 514, is greater than or equal to the threshold. Also, at least one of a demodulation reference signal (DMRS) port or DMRS sequence scrambling identifier may be associated with the indication of the UE capability.

In some instances, the UE may map information associated with the indication of the UE capability, e.g., indication 544, during the RACH procedure. For instance, transmitting the indication of the UE capability, e.g., indication 544, during the RACH procedure may comprise mapping information associated with the indication of the UE capability during the RACH procedure. Also, the information associated with the indication of the UE capability, e.g., indication 544, may be mapped to at least one of a bit level scrambling identifier (ID) of a physical uplink shared channel (PUSCH), a cyclic redundancy check (CRC) mask of a PUSCH, a payload of a message A (msgA) PUSCH or a message 3 (msg3) PUSCH, a medium access control (MAC) header or sub-header, a MAC sub-packet data unit (sub-PDU) format, or an uplink control information (UCI) piggyback pattern.

Additionally, the indication of the UE capability, e.g., indication 544, may be transmitted via at least one of a physical uplink shared channel (PUSCH), a demodulation reference signal (DMRS), a physical uplink control channel (PUCCH), or a physical RACH (PRACH). The indication of the UE capability, e.g., indication 544, may be transmitted via the PUSCH associated with at least one of: slot repetition with redundancy version (RV) combinations, inter-slot frequency hopping, binary phase shift keying (BPSK) modulation, one or more modulation and coding scheme (MCS) tables, or an uplink control information (UCI) piggyback pattern. Also, the indication of the UE capability, e.g., indication 544, may be transmitted via the DMRS associated with at least one of: reduced peak-to-average power ratio (PAPR) sequences, one or more scrambling identifiers (IDs) associated with a DMRS port, group or sequence hopping, or multiple DMRS symbols including a bundling size or an extension of orthogonal cover code size. The indication of the UE capability, e.g., indication 544, may be transmitted via the PUCCH associated with at least one of: an extension of repetition levels, an extension of orthogonal cover code size, an enhancement of frequency hopping patterns, an updated waveform or updated PUCCH format, supporting common and separately configured PUCCH formats, or channel state information (CSI) reporting with a reduced granularity or an increased amount of cyclic redundancy check (CRC) bits. Further, the indication of the UE capability, e.g., indication 544, may be transmitted via the PRACH associated with supporting a shared RACH occasion (RO) and a dedicated RO, where a subcarrier spacing or subcarrier format of the PRACH is separately configured on the dedicated RO for reduced capability (redcap) UEs.

At 550, UE 502 may transmit a confirmation of the UE capability, e.g., confirmation 554. For example, upon establishing the RACH procedure and transmitting the indication of the UE capability during the RACH procedure, the UE may transmit a confirmation of the UE capability, e.g., confirmation 554. In some aspects, the UE may transmit the confirmation of the UE capability after an RRC connection is established. In some instances, upon establishing the RACH procedure and transmitting the indication of the UE capability during the RACH procedure, the transmission of the confirmation of the UE capability may be skipped. At 552, base station 504 may receive a confirmation of the UE capability, e.g., confirmation 554. For example, upon establishing the RACH procedure and receiving the indication of the UE capability during the RACH procedure, the base station may receive a confirmation of the UE capability, e.g., confirmation 554. In some instances, upon establishing the RACH procedure and receiving the indication of the UE capability during the RACH procedure, the confirmation of the UE capability may not be received.

At 560, UE 502 may communicate with the base station based on the indication of the UE capability, e.g., indication 544. Likewise, at 562, base station 504 may communicate with the UE based on the indication of the UE capability, e.g., indication 544.

At 570, base station 504 may transmit, to the UE, a UE capability reduction instruction, e.g., instruction 574, via a physical downlink control channel (PDCCH), where the UE capability reduction instruction includes an identifier of the UE and a capability reduction time period, where capability reduction time period is a time period where the UE capability reduction takes effect. In some instances, the request is received within the capability reduction time period. At 572, UE 502 may receive, from the base station, a UE capability reduction instruction, e.g., instruction 574, via a physical downlink control channel (PDCCH), where the UE capability reduction instruction includes an identifier of the UE and a capability reduction time period, where the request is transmitted within the capability reduction time period.

At 580, UE 502 may transmit, to a base station 504, a request to switch the UE capability from a first UE capability to a second UE capability, e.g., request 584. In some aspects, the second UE capability may be reduced as compared to the first UE capability. At 582, base station 504 may receive, from the UE 502, a request to switch the UE capability from a first UE capability to a second UE capability, e.g., request 584. In some aspects, the request may be transmitted via one of sounding reference signals (SRS), a physical uplink control channel (PUCCH), or a physical uplink shared channel (PUSCH). The request may be associated with an updated random access channel (RACH) procedure, the updated RACH procedure being initiated to transmit the request. Further, the request may correspond to a message A (msgA) when the updated RACH procedure is a 2-step RACH procedure, and the request corresponds to a message 1 (msg1) when the updated RACH procedure is a 4-step RACH procedure.

At 590, base station 504 may transmit, to the UE, one of an acknowledgement (ACK) or a negative ACK (NACK) based on the received request, e.g., ACK/NACK 594. At 592, UE 502 may receive, from the base station, one of an acknowledgement (ACK) or a negative ACK (NACK) based on the transmitted request, e.g., ACK/NACK 594. One of the ACK or the NACK may be received via downlink control information (DCI) or a random access response (RAR). The UE may communicate with the base station based on the second UE capability upon receiving the ACK or based on the first UE capability upon receiving the NACK, where the second UE capability is a reduced capability compared to the first UE capability. Likewise, the base station may communicate with the UE based on the second UE capability upon transmitting the ACK or based on the first UE capability upon transmitting the NACK, where the second UE capability is a reduced capability compared to the first UE capability.

Figure 6:
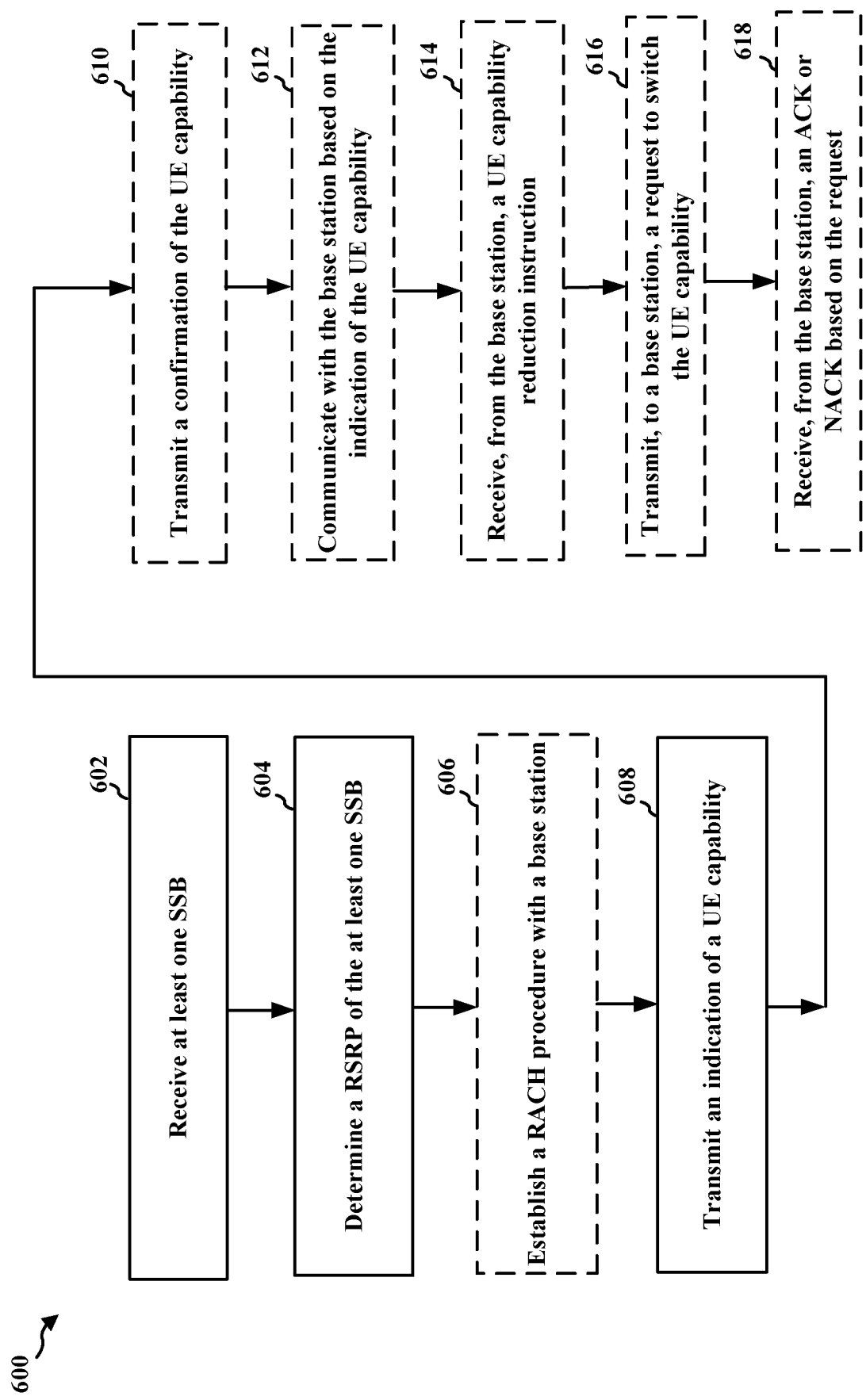
FIG. 6 is a flowchart of a method of wireless communication.

FIG. 6 is a flowchart 600 of a method of wireless communication. The method may be performed by a UE or a component of a UE (e.g., the UE 104, 350, 502; apparatus 802). Optional aspects are illustrated with a dashed line. The methods described herein can provide a number of benefits, such as improving communication signaling, resource utilization, and/or power savings.

At 602, the apparatus may receive, from a base station, at least one synchronization signal block (SSB), as described in connection with the examples in FIGS. 4 and 5. For example, as described in 512 of FIG. 5, UE 502 may receive SSB 514 from base station 504. The at least one SSB, e.g., SSB 514, may correspond to the SS/PBCH block in FIG. 4 including PSS 410, SSS 412, and PBCH 414. Further, 602 may be performed by determination component 840 from FIG. 8.

At 604, the apparatus may determine or measure a reference signal received power (RSRP) of the at least one SSB. In an example, the apparatus may determine whether the reference signal received power (RSRP) of the at least one SSB is less than a threshold, the threshold being configured by the base station, as described in connection with the examples in FIGS. 4 and 5. For example, as described in 520 of FIG. 5, UE 502 may determine whether a RSRP of the at least one SSB 514 is less than a threshold. Further, 604 may be performed by determination component 840 from FIG. 8. In some instances, the threshold may be configured by a base station, e.g., base station 504 in FIG. 5, and received via system information (SI) or radio resource control (RRC) signaling.

At 606, the apparatus may establish a RACH procedure with the base station, as described in connection with the examples in FIGS. 4 and 5. For example, as described in 530 of FIG. 5, UE 502 may establish a RACH procedure 534 with base station 504. Further, 606 may be performed by determination component 840 from FIG. 8.

At 608, the apparatus may transmit, to the base station, an indication of a reduced UE capability of the UE, as described in connection with the examples in FIGS. 4 and 5. For example, as described in 540 of FIG. 5, UE 502 may transmit, to base station 504, an indication 544 of a reduced UE capability. Further, 608 may be performed by determination component 840 from FIG. 8. For instance, the UE may transmit, to the base station, e.g., base station 504, if the RSRP of all of the at least one SSB is less than a threshold, an indication of a reduced UE capability of the UE, e.g., indication 544, during a random access channel (RACH) procedure, the threshold being configured by the base station, as described in connection with the examples in FIGS. 4 and 5. Also, the apparatus may transmit, to the base station, e.g., base station 504, if the RSRP of one of the at least one SSB is greater than or equal to the threshold, the indication of the reduced UE capability of the UE, e.g., indication 544, after entering into a radio resource control (RRC) connected state upon completion of the RACH procedure.

In some aspects, if the indication of the reduced UE capability, e.g., indication 544, is transmitted during the RACH procedure, the indication may correspond to a message A (msgA) physical uplink shared channel (PUSCH) when the RACH procedure is a 2-step RACH procedure or a message 3 (msg3) PUSCH when the RACH procedure is a 4-step RACH procedure. The msgA or the msg3 may be transmitted via one or more demodulation reference signal (DMRS) resources associated with or dedicated to reduced capability (redcap) UEs. Further, if the indication of the reduced UE capability, e.g., indication 544, is transmitted during the RACH procedure, the indication may correspond to one or more physical RACH (PRACH) preambles on one or more RACH occasions associated with or dedicated to reduced capability (redcap) UEs. The indication of the reduced UE capability, e.g., indication 544, may also be transmitted during the RACH procedure when the RSRP of all of the at least one SSB is less than or equal to the threshold, and the at least one SSB is measured after a cell selection. Also, at least one of a demodulation reference signal (DMRS) port or DMRS sequence scrambling identifier may be associated with the indication of the reduced UE capability, e.g., indication 544.

In some instances, the UE may map information associated with the indication of the reduced UE capability, e.g., indication 544, during the RACH procedure, e.g., RACH procedure 534. For instance, transmitting the indication of the reduced UE capability, e.g., indication 544, during the RACH procedure may comprise mapping information associated with the indication of the reduced UE capability during the RACH procedure. Also, the information associated with the indication of the reduced UE capability may be mapped to at least one of a bit level scrambling identifier (ID) of a physical uplink shared channel (PUSCH), a cyclic redundancy check (CRC) mask of a PUSCH, a payload of a message A (msgA) PUSCH or a message 3 (msg3) PUSCH, a medium access control (MAC) header or sub-header, a MAC sub-packet data unit (sub-PDU) format, or an uplink control information (UCI) piggyback pattern.

Additionally, the indication of the reduced UE capability, e.g., indication 544, may be transmitted via at least one of a physical uplink shared channel (PUSCH), a demodulation reference signal (DMRS), a physical uplink control channel (PUCCH), or a physical RACH (PRACH). The indication of the reduced UE capability, e.g., indication 544, may be transmitted via the PUSCH associated with at least one of: slot repetition with redundancy version (RV) combinations, inter-slot frequency hopping, binary phase shift keying (BPSK) modulation, one or more modulation and coding scheme (MCS) tables, or an uplink control information (UCI) piggyback pattern. Also, the indication of the reduced UE capability, e.g., indication 544, may be transmitted via the DMRS associated with at least one of: reduced peak-to-average power ratio (PAPR) sequences, one or more scrambling identifiers (IDs) associated with a DMRS port, group or sequence hopping, or multiple DMRS symbols including a bundling size or an extension of orthogonal cover code size. The indication of the reduced UE capability, e.g., indication 544, may be transmitted via the PUCCH associated with at least one of: an extension of repetition levels, an extension of orthogonal cover code size, an enhancement of frequency hopping patterns, an updated waveform or updated PUCCH format, supporting common and separately configured PUCCH formats, or channel state information (CSI) reporting with a reduced granularity or an increased amount of cyclic redundancy check (CRC) bits. Further, the indication of the reduced UE capability, e.g., indication 544, may be transmitted via the PRACH associated with supporting a shared RACH occasion (RO) and a dedicated RO, where a subcarrier spacing or subcarrier format of the PRACH is separately configured on the dedicated RO for reduced capability (redcap) UEs.

At 610, the apparatus may transmit a confirmation of the reduced UE capability, e.g., confirmation 554. For example, upon establishing the RACH procedure and transmitting the indication of the reduced UE capability during the RACH procedure, the UE may transmit a confirmation of the reduced UE capability, e.g., confirmation 554, as described in connection with the examples in FIGS. 4 and 5. For instance, as described in 550 of FIG. 5, UE 502 may transmit a confirmation of the reduced UE capability, e.g., confirmation 554. Further, 610 may be performed by determination component 840 from FIG. 8. In some instances, upon establishing the RACH procedure and transmitting the indication of the reduced UE capability during the RACH procedure, the transmission of the confirmation of the reduced UE capability may be skipped after an RRC connection establishment.

At 612, the apparatus may communicate with the base station based on the indication of the reduced UE capability and within a downlink and uplink bandwidth part (BWP) configuration associated with a corresponding UE capability, wherein the downlink and uplink BWP configuration is broadcast in system information of the base station, as described in connection with the examples in FIGS. 4 and 5. For example, as described in 560 of FIG. 5, UE 502 may communicate with the base station 504 based on the indication of the reduced UE capability, e.g., indication 544. Further, 612 may be performed by determination component 840 from FIG. 8.

At 614, the apparatus may receive, from the base station, a UE capability reduction instruction via a physical downlink control channel (PDCCH), where the UE capability reduction instruction includes an identifier of the UE and a capability reduction time period, where the request is transmitted within the capability reduction time period, as described in connection with the examples in FIGS. 4 and 5. For example, as described in 572 of FIG. 5, UE 502 may receive, from the base station 504, a UE capability reduction instruction via a PDCCH, e.g., instruction 574. Further, 614 may be performed by determination component 840 from FIG. 8.

At 616, the apparatus may transmit, to a base station, a request to switch a UE capability from a first UE capability to a second UE capability, as described in connection with the examples in FIGS. 4 and 5. For example, as described in 580 of FIG. 5, UE 502 may transmit, to a base station 504, a request to switch the UE capability from a first UE capability to a second UE capability, e.g., request 584. Further, 616 may be performed by determination component 840 from FIG. 8. In some aspects, the request, e.g., request 584, may be transmitted via one of sounding reference signals (SRS), a physical random access channel (PRACH), a physical uplink control channel (PUCCH), or a physical uplink shared channel (PUSCH). The request, e.g., request 584, may be associated with an updated type of random access channel (RACH) procedure, the updated type of RACH procedure being initiated to transmit the request. Further, the request, e.g., request 584, may correspond to a message A (msgA) when the updated type of RACH procedure is a 2-step RACH procedure, and the request may correspond to a message 1 (msg1) when the updated type of RACH procedure is a 4-step RACH procedure.

At 618, the apparatus may receive, from the base station, one of an acknowledgement (ACK) or a negative ACK (NACK) based on the transmitted request, as described in connection with the examples in FIGS. 4 and 5. For example, as described in 592 of FIG. 5, UE 502 may receive, from the base station, 504 one of ACK/NACK 594 based on the transmitted request 584. Further, 618 may be performed by determination component 840 from FIG. 8. The UE may communicate with the base station based on the second UE capability upon receiving the ACK, or the UE may communicate based on the first UE capability upon receiving the NACK, where the second UE capability is a reduced capability compared to the first UE capability. Also, one of the ACK or the NACK may be received via downlink control information (DCI) or a random access response (RAR).

Figure 7:
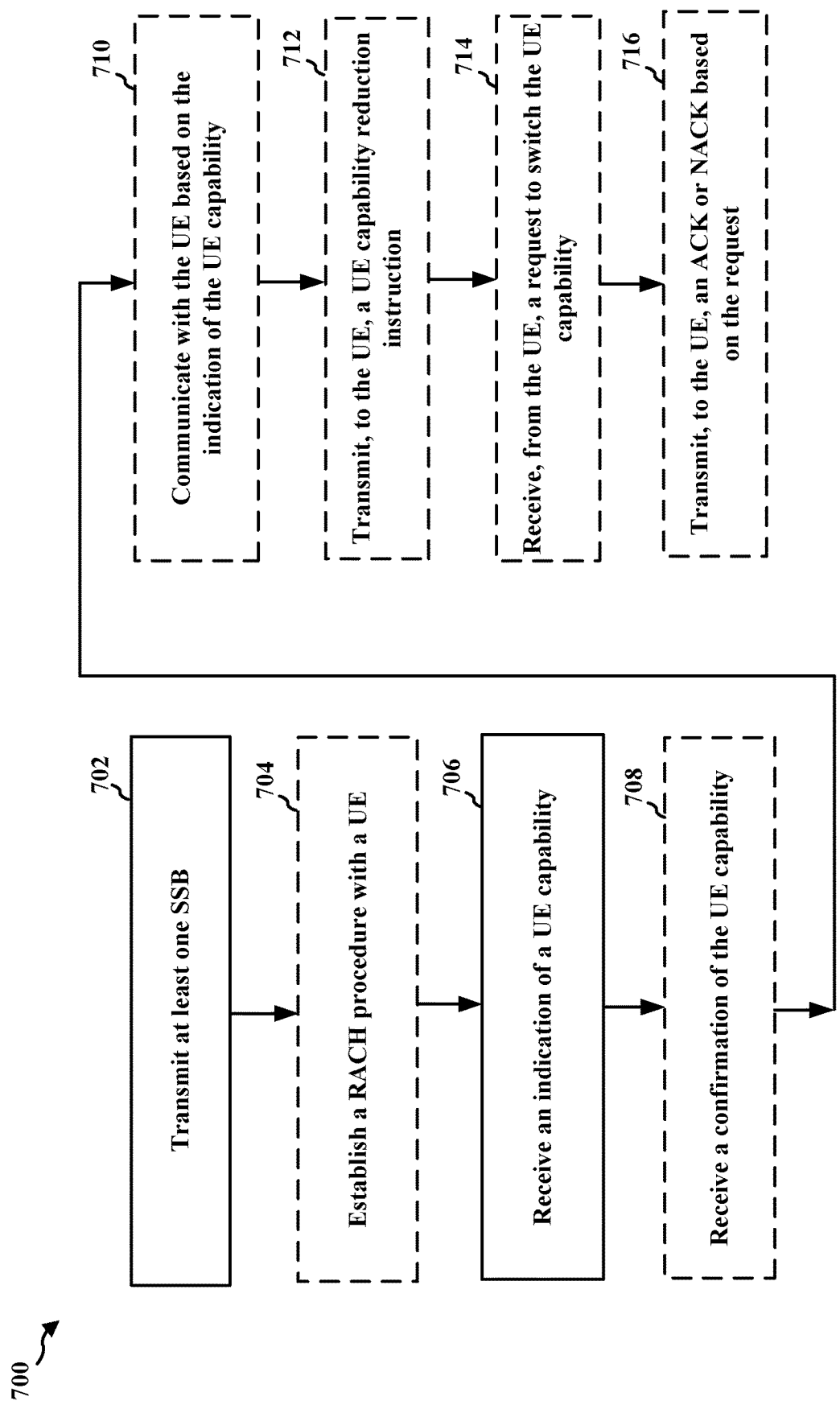
FIG. 7 is a flowchart of a method of wireless communication.

FIG. 7 is a flowchart 700 of a method of wireless communication. The method may be performed by a base station or a component of a base station (e.g., the base station 102/180, 310, 504; apparatus 902). Optional aspects are illustrated with a dashed line. The methods described herein can provide a number of benefits, such as improving communication signaling, resource utilization, and/or power savings.

At 702, the apparatus may transmit, to a UE, at least one synchronization signal block (SSB), as described in connection with the examples in FIGS. 4 and 5. For example, as described in 510 of FIG. 5, base station 504 may transmit SSB 514 to UE 502. The at least one SSB, e.g., SSB 514, may correspond to the SS/PBCH block in FIG. 4 including PSS 410, SSS 412, and PBCH 414. Further, 702 may be performed by determination component 940 from FIG. 9.

At 704, the apparatus may establish a RACH procedure with the UE, as described in connection with the examples in FIGS. 4 and 5. For example, as described in 532 of FIG. 5, base station 504 may establish a RACH procedure, e.g., RACH procedure 534, with the UE 502. Further, 704 may be performed by determination component 940 from FIG. 9.

At 706, the apparatus may receive, from the UE, an indication of a reduced UE capability of the UE during a random access channel (RACH) procedure or after entering into a radio resource control (RRC) connected state upon completion of the RACH procedure, where the indication of the reduced UE capability may be based on a threshold associated with a reference signal received power (RSRP) of the at least one SSB, the threshold being configured by the base station, as described in connection with the examples in FIGS. 4 and 5. For example, as described in 542 of FIG. 5, base station 504 may receive, from the UE 502, an indication of a reduced UE capability 544. Further, 706 may be performed by determination component 940 from FIG. 9. The threshold may be configured by a base station and transmitted via system information (SI) or radio resource control (RRC) signaling.

In some instances, if the indication of the reduced UE capability, e.g., indication 544, is received during the RACH procedure, the indication may correspond to a message A (msgA) physical uplink shared channel (PUSCH) when the RACH procedure is a 2-step RACH procedure or a message 3 (msg3) PUSCH when the RACH procedure is a 4-step RACH procedure. The msgA or the msg3 may be received via one or more demodulation reference signal (DMRS) resources associated with reduced capability (redcap) UEs. Also, if the indication of the reduced UE capability, e.g., indication 544, is received during the RACH procedure, the indication may correspond to one or more physical RACH (PRACH) preambles on one or more RACH occasions associated with reduced capability (redcap) UEs. Further, the indication of the reduced UE capability, e.g., indication 544, may be received during the RACH procedure when the RSRP of all of the at least one SSB is less than or equal to the threshold, and the at least one SSB is measured after a cell selection. The indication of the reduced UE capability, e.g., indication 544, may also be received after entering into a radio resource control (RRC) connected state upon completion of the RACH procedure when the RSRP of one of the at least one SSB is greater than or equal to the threshold.

In some aspects, the indication of the reduced UE capability, e.g., indication 544, may be associated with information that is mapped during the RACH procedure. The information associated with the indication of the reduced UE capability may be mapped to at least one of a bit level scrambling identifier (ID) of a physical uplink shared channel (PUSCH), a cyclic redundancy check (CRC) mask of a PUSCH, a payload of a message A (msgA) PUSCH or a message 3 (msg3) PUSCH, a medium access control (MAC) header or sub-header, a MAC sub-packet data unit (sub-PDU) format, or an uplink control information (UCI) piggyback pattern. Additionally, at least one of a demodulation reference signal (DMRS) port or DMRS sequence scrambling identifier may be associated with the indication of the reduced UE capability, e.g., indication 544.

Moreover, the indication of the reduced UE capability, e.g., indication 544, may be received via at least one of a physical uplink shared channel (PUSCH), a demodulation reference signal (DMRS), a physical uplink control channel (PUCCH), or a physical RACH (PRACH). The indication of the reduced UE capability, e.g., indication 544, may be received via the PUSCH associated with at least one of: slot repetition with redundancy version (RV) combinations, inter-slot frequency hopping, binary phase shift keying (BPSK) modulation, one or more modulation and coding scheme (MCS) tables, or an uplink control information (UCI) piggyback pattern. Also, the indication of the reduced UE capability, e.g., indication 544, may be received via the DMRS associated with at least one of: reduced peak-to-average power ratio (PAPR) sequences, one or more scrambling identifiers (IDs) associated with a DMRS port, group or sequence hopping, or multiple DMRS symbols including a bundling size or an extension of orthogonal cover code size. The indication of the reduced UE capability, e.g., indication 544, may be received via the PUCCH associated with at least one of: an extension of repetition levels, an extension of orthogonal cover code size, an enhancement of frequency hopping patterns, an updated waveform or updated PUCCH format, supporting common and separately configured PUCCH formats, or channel state information (CSI) reporting with a reduced granularity or an increased amount of cyclic redundancy check (CRC) bits. The indication of the reduced UE capability, e.g., indication 544, may also be received via the PRACH associated with supporting a shared RACH occasion (RO) and a dedicated RO, where a subcarrier spacing or subcarrier format of the PRACH is separately configured on the dedicated RO for reduced capability (redcap) UEs.

At 708, the apparatus may receive a confirmation of the reduced UE capability, as described in connection with the examples in FIGS. 4 and 5. For example, as described in 552 of FIG. 5, base station 504 may receive a confirmation 554 of the reduced UE capability. Further, 708 may be performed by determination component 940 from FIG. 9. For instance, upon establishing the RACH procedure and receiving the indication of the reduced UE capability during the RACH procedure, the apparatus may receive a confirmation of the reduced UE capability, e.g., confirmation 554. In some instances, upon establishing the RACH procedure and receiving the indication of the reduced UE capability during the RACH procedure, the confirmation of the reduced UE capability may not be received after an RRC connection establishment.

At 710, the apparatus may communicate with the UE based on the indication of the reduced UE capability and within a downlink and uplink bandwidth part (BWP) configuration associated with a corresponding UE capability, wherein the downlink and uplink BWP configuration is broadcast in system information of the base station, as described in connection with the examples in FIGS. 4 and 5. For example, as described in 562 of FIG. 5, base station 504 may communicate with the UE 502 based on the indication of the reduced UE capability, e.g., indication 544. Further, 710 may be performed by determination component 940 from FIG. 9.

At 712, the apparatus may transmit, to the UE, a UE capability reduction instruction via a physical downlink control channel (PDCCH), where the UE capability reduction instruction includes an identifier of the UE and a capability reduction time period, where the request is received within the capability reduction time period, as described in connection with the examples in FIGS. 4 and 5. For example, as described in 570 of FIG. 5, base station 504 may transmit, to the UE 502, a UE capability reduction instruction 574 via a PDCCH. Further, 712 may be performed by determination component 940 from FIG. 9.

At 714, the apparatus may receive, from the UE, a request to switch a UE capability from a first UE capability to a second UE capability, as described in connection with the examples in FIGS. 4 and 5. For example, as described in 582 of FIG. 5, base station 504 may receive, from the UE 502, a request 584 to switch the UE capability from a first UE capability to a second UE capability. Further, 714 may be performed by determination component 940 from FIG. 9. The request, e.g., request 584, may be received via one of sounding reference signals (SRS), a physical random access channel (PRACH), a physical uplink control channel (PUCCH), or a physical uplink shared channel (PUSCH). Also, the request, e.g., request 584, may be associated with an updated type of random access channel (RACH) procedure, the updated type of RACH procedure being initiated based on the request. The request, e.g., request 584, may correspond to a message A (msgA) when the updated type of RACH procedure is a 2-step RACH procedure, and the request may correspond to a message 1 (msg1) when the updated type of RACH procedure is a 4-step RACH procedure.

At 716, the apparatus may transmit, to the UE, one of an acknowledgement (ACK) or a negative ACK (NACK) based on the received request, as described in connection with the examples in FIGS. 4 and 5. For example, as described in 590 of FIG. 5, base station 504 may transmit, to the UE 502, one of ACK/NACK 594 based on the received request 584. Further, 716 may be performed by determination component 940 from FIG. 9. The apparatus may communicate with the UE based on the second UE capability upon transmitting the ACK, or the apparatus may communicate based on the first UE capability upon transmitting the NACK, where the second UE capability is a reduced capability compared to the first UE capability. One of the ACK or the NACK, e.g., ACK/NACK 594, may be transmitted via downlink control information (DCI) or a random access response (RAR).

Figure 8:
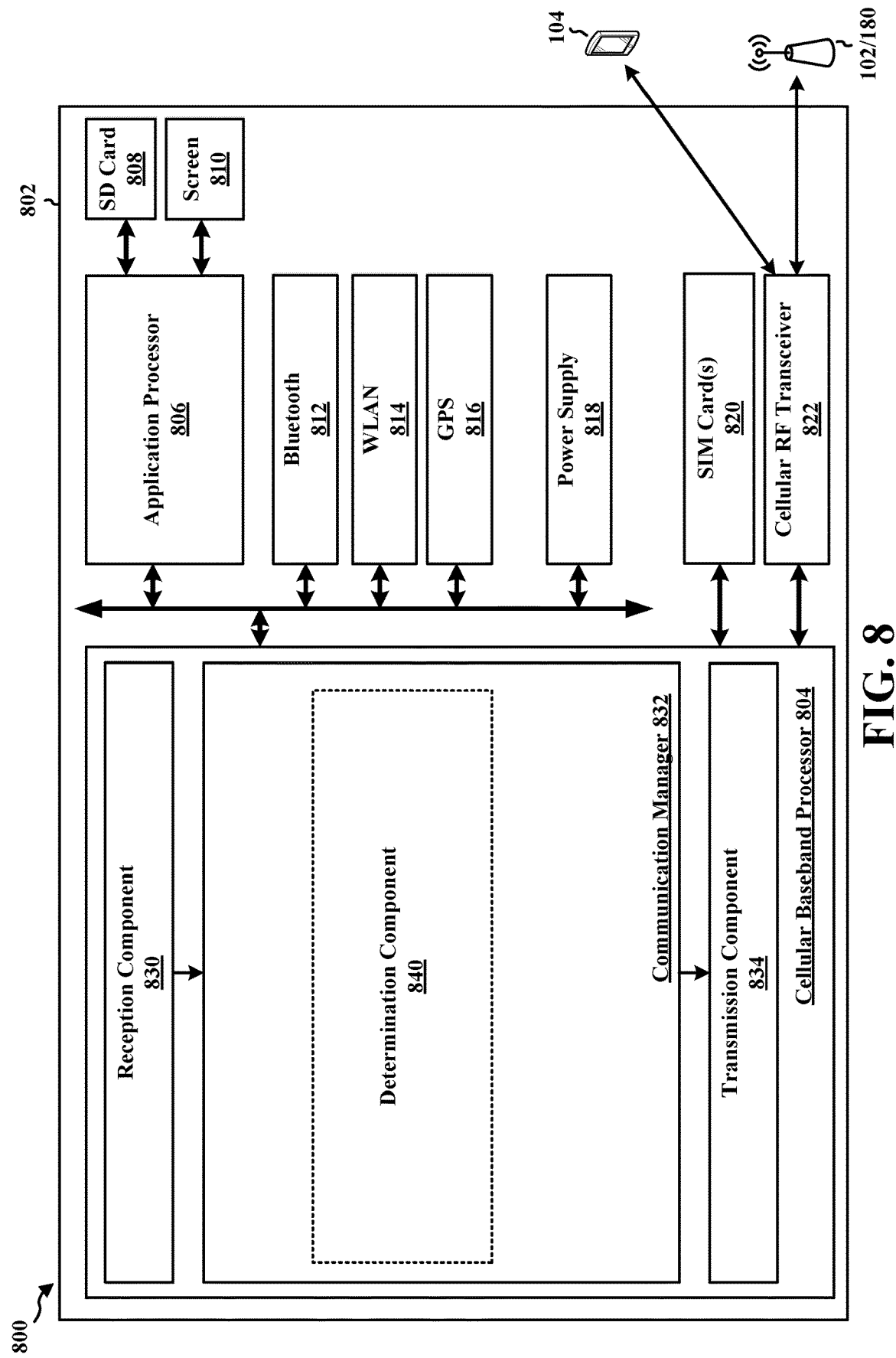
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a determination component 840 that may be configured to receive, from a base station, at least one synchronization signal block (SSB), e.g., as described in connection with 602 in FIG. 6. Determination component 840 may also be configured to determine a reference signal received power (RSRP) of the at least one SSB, e.g., as described in connection with 604 in FIG. 6. Determination component 840 may also be configured to establish the RACH procedure with the base station, e.g., as described in connection with 606 in FIG. 6. Determination component 840 may also be configured to transmit, to the base station if the RSRP of the at least one SSB is less than a threshold, an indication of a UE capability of the UE during a random access channel (RACH) procedure; and transmit, to the base station if the RSRP of the at least one SSB is greater than or equal to the threshold, the indication of the UE capability of the UE after entering into a radio resource control (RRC) connected state upon completion of the RACH procedure, e.g., as described in connection with 608 in FIG. 6. Determination component 840 may also be configured to transmit a confirmation of the UE capability, e.g., as described in connection with 610 in FIG. 6. Determination component 840 may also be configured to communicate with the base station based on the indication of the UE capability, e.g., as described in connection with 612 in FIG. 6. Determination component 840 may also be configured to receive, from the base station, a UE capability reduction instruction via a physical downlink control channel (PDCCH), where the UE capability reduction instruction includes an identifier of the UE and a capability reduction time period, where the request is transmitted within the capability reduction time period, e.g., as described in connection with 614 in FIG. 6. Determination component 840 may also be configured to transmit, to a base station, a request to switch the UE capability from a first UE capability to a second UE capability, e.g., as described in connection with 616 in FIG. 6. Determination component 840 may also be configured to receive, from the base station, one of an acknowledgement (ACK) or a negative ACK (NACK) based on the transmitted request, e.g., as described in connection with 618 in FIG. 6.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a base station, at least one synchronization signal block (SSB); means for determining a reference signal received power (RSRP) of the at least one SSB; means for transmitting, to the base station if the RSRP of the at least one SSB is less than a threshold, an indication of a UE capability of the UE during a random access channel (RACH) procedure; means for transmitting, to the base station if the RSRP of the at least one SSB is greater than or equal to the threshold, the indication of the UE capability of the UE after entering into a radio resource control (RRC) connected state upon completion of the RACH procedure; means for mapping information associated with the indication of the UE capability during the RACH procedure; means for establishing the RACH procedure with the base station; means for transmitting a confirmation of the UE capability; means for communicating with the base station based on the indication of the UE capability; means for transmitting, to a base station, a request to switch the UE capability from a first UE capability to a second UE capability; means for receiving, from the base station, one of an acknowledgement (ACK) or a negative ACK (NACK) based on the transmitted request; means for communicating with the base station based on the second UE capability upon receiving the ACK or based on the first UE capability upon receiving the NACK, where the second UE capability is a reduced capability compared to the first UE capability; and means for receiving, from the base station, a UE capability reduction instruction via a physical downlink control channel (PDCCH), where the UE capability reduction instruction includes an identifier of the UE and a capability reduction time period, where the request is transmitted within the capability reduction time period. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
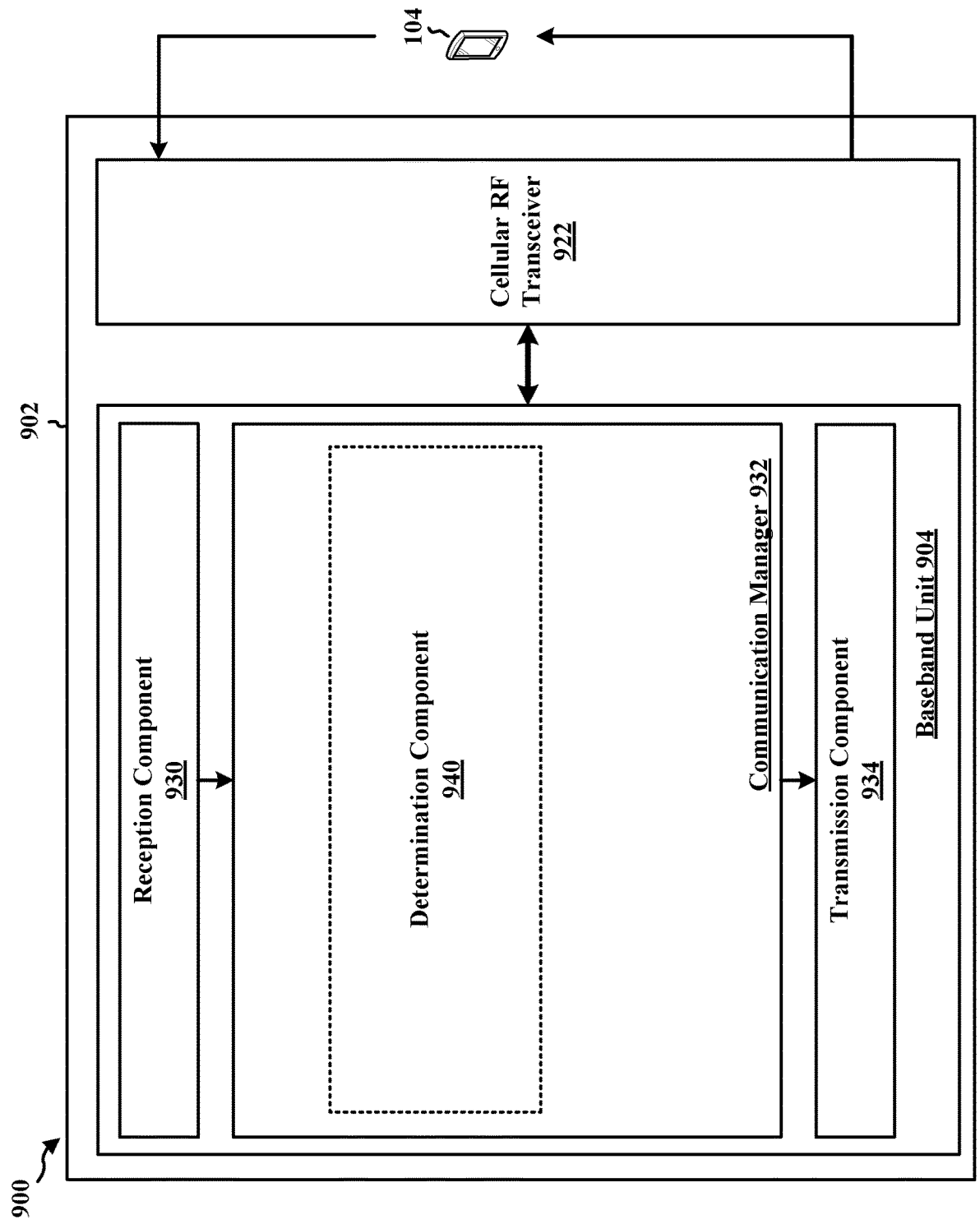
FIG. 9 is a diagram illustrating an example of a hardware implementation for an example apparatus.

FIG. 9 is a diagram 900 illustrating an example of a hardware implementation for an apparatus 902. The apparatus 902 is a base station (BS) and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a determination component 940 that may be configured to transmit, to a user equipment (UE), at least one synchronization signal block (SSB), e.g., as described in connection with 702 in FIG. 7. Determination component 940 may also be configured to establish the RACH procedure with the UE, e.g., as described in connection with 704 in FIG. 7. Determination component 940 may also be configured to receive, from the UE, an indication of a UE capability of the UE during a random access channel (RACH) procedure or after entering into a radio resource control (RRC) connected state upon completion of the RACH procedure, the indication of the UE capability being based on a threshold associated with a reference signal received power (RSRP) of the at least one SSB, e.g., as described in connection with 706 in FIG. 7. Determination component 940 may also be configured to receive a confirmation of the UE capability, e.g., as described in connection with 708 in FIG. 7. Determination component 940 may also be configured to communicate with the UE based on the indication of the UE capability, e.g., as described in connection with 710 in FIG. 7. Determination component 940 may also be configured to transmit, to the UE, a UE capability reduction instruction via a physical downlink control channel (PDCCH), where the UE capability reduction instruction includes an identifier of the UE and a capability reduction time period, where the request is received within the capability reduction time period, e.g., as described in connection with 712 in FIG. 7. Determination component 940 may also be configured to receive, from the UE, a request to switch the UE capability from a first UE capability to a second UE capability, e.g., as described in connection with 714 in FIG. 7. Determination component 940 may also be configured to transmit, to the UE, one of an acknowledgement (ACK) or a negative ACK (NACK) based on the received request, e.g., as described in connection with 716 in FIG. 7.

The apparatus may include additional components that perform each of the blocks of the algorithm in the aforementioned flowcharts of FIGS. 5 and 7. As such, each block in the aforementioned flowcharts of FIGS. 5 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a user equipment (UE), at least one synchronization signal block (SSB); means for establishing the RACH procedure with the UE; means for receiving, from the UE, an indication of a UE capability of the UE during a random access channel (RACH) procedure or after entering into a radio resource control (RRC) connected state upon completion of the RACH procedure, the indication of the UE capability being based on a threshold associated with a reference signal received power (RSRP) of the at least one SSB; means for receiving a confirmation of the UE capability; means for communicating with the UE based on the indication of the UE capability; means for transmitting, to the UE, a UE capability reduction instruction via a physical downlink control channel (PDCCH), where the UE capability reduction instruction includes an identifier of the UE and a capability reduction time period, where the request is received within the capability reduction time period; means for receiving, from the UE, a request to switch the UE capability from a first UE capability to a second UE capability; means for transmitting, to the UE, one of an acknowledgement (ACK) or a negative ACK (NACK) based on the received request; and means for communicating with the UE based on the second UE capability upon transmitting the ACK or based on the first UE capability upon transmitting the NACK, where the second UE capability is a reduced capability compared to the first UE capability. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes receiving, from a base station, at least one synchronization signal block (SSB); determining a reference signal received power (RSRP) of the at least one SSB; transmitting, to the base station if the RSRP of all of the at least one SSB is less than a threshold, an indication of a reduced UE capability of the UE during a random access channel (RACH) procedure, the threshold being configured by the base station; and transmitting, to the base station if the RSRP of one of the at least one SSB is greater than or equal to the threshold, the indication of the reduced UE capability of the UE after entering into a radio resource control (RRC) connected state upon completion of the RACH procedure.

Aspect 2 is the method of aspect 1, where if the indication of the reduced UE capability is transmitted during the RACH procedure, the indication corresponds to a message A (msgA) physical uplink shared channel (PUSCH) when the RACH procedure is a 2-step RACH procedure or a message 3 (msg3) PUSCH when the RACH procedure is a 4-step RACH procedure.

Aspect 3 is the method of any of aspects 1 and 2, where the msgA or the msg3 is transmitted via one or more demodulation reference signal (DMRS) resources associated with reduced capability (redcap) UEs.

Aspect 4 is the method of any of aspects 1 to 3, where transmitting the indication of the reduced UE capability during the RACH procedure comprises: mapping information associated with the indication of the reduced UE capability during the RACH procedure.

Aspect 5 is the method of any of aspects 1 to 4, where the information associated with the indication of the reduced UE capability is mapped to at least one of a bit level scrambling identifier (ID) of a physical uplink shared channel (PUSCH), a cyclic redundancy check (CRC) mask of a PUSCH, a payload of a message A (msgA) PUSCH or a message 3 (msg3) PUSCH, a medium access control (MAC) header or sub-header, a MAC sub-packet data unit (sub-PDU) format, or an uplink control information (UCI) piggyback pattern of a PUSCH.

Aspect 6 is the method of any of aspects 1 to 5, where if the indication of the reduced UE capability is transmitted during the RACH procedure, the indication corresponds to one or more physical RACH (PRACH) preambles on one or more RACH occasions associated with reduced capability (redcap) UEs.

Aspect 7 is the method of any of aspects 1 to 6, where the indication of the reduced UE capability is transmitted during the RACH procedure when the RSRP of all of the at least one SSB is less than or equal to the threshold, and the at least one SSB is measured after a cell selection.

Aspect 8 is the method of any of aspects 1 to 7, further comprising: establishing the RACH procedure with the base station; where, upon establishing the RACH procedure and transmitting the indication of the reduced UE capability during the RACH procedure, the method further comprises: transmitting a confirmation of the reduced UE capability.

Aspect 9 is the method of any of aspects 1 to 8, where, upon establishing the RACH procedure and transmitting the indication of the reduced UE capability during the RACH procedure, transmission of the confirmation of the reduced UE capability is skipped after an RRC connection establishment.

Aspect 10 is the method of any of aspects 1 to 9, further comprising: communicating with the base station based on the indication of the reduced UE capability and within a downlink and uplink bandwidth part (BWP) configuration associated with a corresponding UE capability, wherein the downlink and uplink BWP configuration is broadcast in system information of the base station.

Aspect 11 is the method of any of aspects 1 to 10, where the threshold is configured by the base station and received via system information (SI) or radio resource control (RRC) signaling.

Aspect 12 is the method of any of aspects 1 to 11, where at least one of a demodulation reference signal (DMRS) port or DMRS sequence scrambling identifier is associated with the indication of the reduced UE capability.

Aspect 13 is the method of any of aspects 1 to 12, where the indication of the reduced UE capability is transmitted via at least one of a physical uplink shared channel (PUSCH), a demodulation reference signal (DMRS), a physical uplink control channel (PUCCH), or a physical RACH (PRACH).

Aspect 14 is the method of any of aspects 1 to 13, where the indication of the reduced UE capability is transmitted via the PUSCH associated with at least one of: slot repetition with redundancy version (RV) combinations, inter-slot frequency hopping, binary phase shift keying (BPSK) modulation, one or more modulation and coding scheme (MCS) tables, or an uplink control information (UCI) piggyback pattern.

Aspect 15 is the method of any of aspects 1 to 14, where the indication of the reduced UE capability is transmitted via the DMRS associated with at least one of: reduced peak-to-average power ratio (PAPR) sequences, one or more scrambling identifiers (IDs) associated with a DMRS port, group or sequence hopping, or multiple DMRS symbols including a bundling size or an extension of orthogonal cover code size.

Aspect 16 is the method of any of aspects 1 to 15, where the indication of the reduced UE capability is transmitted via the PUCCH associated with at least one of: an extension of repetition levels, an extension of orthogonal cover code size, an enhancement of frequency hopping patterns, an updated waveform or updated PUCCH format, supporting common and separately configured PUCCH formats, or channel state information (CSI) reporting with a reduced granularity or an increased amount of cyclic redundancy check (CRC) bits.

Aspect 17 is the method of any of aspects 1 to 16, where the indication of the reduced UE capability is transmitted via the PRACH associated with supporting a shared RACH occasion (RO) and a dedicated RO, where a subcarrier spacing or subcarrier format of the PRACH is separately configured on the dedicated RO for reduced capability (redcap) UEs.

Aspect 18 is the method of any of aspects 1 to 17, further comprising: transmitting, to a base station, a request to switch a UE capability from a first UE capability to a second UE capability; and receiving, from the base station, one of an acknowledgement (ACK) or a negative ACK (NACK) based on the transmitted request.

Aspect 19 is the method of any of aspects 1 to 18, where the request is transmitted via one of sounding reference signals (SRS), a physical random access channel (PRACH), a physical uplink control channel (PUCCH), or a physical uplink shared channel (PUSCH).

Aspect 20 is the method of any of aspects 1 to 19, where the one of the ACK or the NACK is received via downlink control information (DCI) or a random access response (RAR).

Aspect 21 is the method of any of aspects 1 to 20, where the request is associated with an updated type of random access channel (RACH) procedure, the updated type of RACH procedure being initiated to transmit the request.

Aspect 22 is the method of any of aspects 1 to 21, where the request corresponds to a message A (msgA) when the updated type of RACH procedure is a 2-step RACH procedure, and the request corresponds to a message 1 (msg1) when the updated type of RACH procedure is a 4-step RACH procedure.

Aspect 23 is the method of any of aspects 1 to 22, further comprising: communicating with the base station based on the second UE capability upon receiving the ACK or based on the first UE capability upon receiving the NACK, where the second UE capability is a reduced capability compared to the first UE capability.

Aspect 24 is the method of any of aspects 1 to 23, further comprising: receiving, from the base station, a UE capability reduction instruction via a physical downlink control channel (PDCCH), where the UE capability reduction instruction includes an identifier of the UE and a capability reduction time period, where the request is transmitted within the capability reduction time period.

Aspect 25 is an apparatus for wireless communication including means for implementing a method as in any of aspects 1 to 24.

Aspect 26 is an apparatus for wireless communication including at least one processor coupled to a memory and configured to implement a method as in any of aspects 1 to 24.

Aspect 27 is a computer-readable medium storing computer executable code, where the code when executed by a processor causes the processor to implement a method as in any of aspects 1 to 24.

Aspect 28 is a method of wireless communication of a base station. The method includes transmitting, to a user equipment (UE), at least one synchronization signal block (SSB); and receiving, from the UE, an indication of a reduced UE capability of the UE during a random access channel (RACH) procedure or after entering into a radio resource control (RRC) connected state upon completion of the RACH procedure, the indication of the reduced UE capability being based on a threshold associated with a reference signal received power (RSRP) of the at least one SSB, the threshold being configured by the base station.

Aspect 29 is the method of aspect 28, where if the indication of the reduced UE capability is received during the RACH procedure, the indication corresponds to a message A (msgA) physical uplink shared channel (PUSCH) when the RACH procedure is a 2-step RACH procedure or a message 3 (msg3) PUSCH when the RACH procedure is a 4-step RACH procedure.

Aspect 30 is the method of any of aspects 28 and 29, where the msgA or the msg3 is received via one or more demodulation reference signal (DMRS) resources associated with reduced capability (redcap) UEs.

Aspect 31 is the method of any of aspects 28 to 30, where the indication of the reduced UE capability is associated with information that is mapped during the RACH procedure.

Aspect 32 is the method of any of aspects 28 to 31, where the information associated with the indication of the reduced UE capability is mapped to at least one of a bit level scrambling identifier (ID) of a physical uplink shared channel (PUSCH), a cyclic redundancy check (CRC) mask of a PUSCH, a payload of a message A (msgA) PUSCH or a message 3 (msg3) PUSCH, a medium access control (MAC) header or sub-header, a MAC sub-packet data unit (sub-PDU) format, or an uplink control information (UCI) piggyback pattern of a PUSCH.

Aspect 33 is the method of any of aspects 28 to 32, where if the indication of the reduced UE capability is received during the RACH procedure, the indication corresponds to one or more physical RACH (PRACH) preambles on one or more RACH occasions associated with reduced capability (redcap) UEs.

Aspect 34 is the method of any of aspects 28 to 33, where the indication of the reduced UE capability is received during the RACH procedure when the RSRP of all of the at least one SSB is less than or equal to the threshold, and the at least one SSB is measured after a cell selection; where the indication of the reduced UE capability is received after entering into a radio resource control (RRC) connected state upon completion of the RACH procedure when the RSRP of one of the at least one SSB is greater than or equal to the threshold.

Aspect 35 is the method of any of aspects 28 to 34, further comprising: establishing the RACH procedure with the UE; where, upon establishing the RACH procedure and receiving the indication of the reduced UE capability during the RACH procedure, the method further comprises: receiving a confirmation of the reduced UE capability.

Aspect 36 is the method of any of aspects 28 to 35, where, upon establishing the RACH procedure and receiving the indication of the reduced UE capability during the RACH procedure, the confirmation of the reduced UE capability is not received after an RRC connection establishment.

Aspect 37 is the method of any of aspects 28 to 36, further comprising: communicating with the UE based on the indication of the reduced UE capability and within a downlink and uplink bandwidth part (BWP) configuration associated with a corresponding UE capability, wherein the downlink and uplink BWP configuration is broadcast in system information of the base station.

Aspect 38 is the method of any of aspects 28 to 37, where the threshold is configured by the base station and transmitted via system information (SI) or radio resource control (RRC) signaling.

Aspect 39 is the method of any of aspects 28 to 38, where at least one of a demodulation reference signal (DMRS) port or DMRS sequence scrambling identifier is associated with the indication of the reduced UE capability.

Aspect 40 is the method of any of aspects 28 to 39, where the indication of the reduced UE capability is received via at least one of a physical uplink shared channel (PUSCH), a demodulation reference signal (DMRS), a physical uplink control channel (PUCCH), or a physical RACH (PRACH).

Aspect 41 is the method of any of aspects 28 to 40, where the indication of the reduced UE capability is received via the PUSCH associated with at least one of: slot repetition with redundancy version (RV) combinations, inter-slot frequency hopping, binary phase shift keying (BPSK) modulation, one or more modulation and coding scheme (MCS) tables, or an uplink control information (UCI) piggyback pattern.

Aspect 42 is the method of any of aspects 28 to 41, where the indication of the reduced UE capability is received via the DMRS associated with at least one of: reduced peak-to-average power ratio (PAPR) sequences, one or more scrambling identifiers (IDs) associated with a DMRS port, group or sequence hopping, or multiple DMRS symbols including a bundling size or an extension of orthogonal cover code size.

Aspect 43 is the method of any of aspects 28 to 42, where the indication of the reduced UE capability is received via the PUCCH associated with at least one of: an extension of repetition levels, an extension of orthogonal cover code size, an enhancement of frequency hopping patterns, an updated waveform or updated PUCCH format, supporting common and separately configured PUCCH formats, or channel state information (CSI) reporting with a reduced granularity or an increased amount of cyclic redundancy check (CRC) bits.

Aspect 44 is the method of any of aspects 28 to 43, where the indication of the reduced UE capability is received via the PRACH associated with supporting a shared RACH occasion (RO) and a dedicated RO, where a subcarrier spacing or subcarrier format of the PRACH is separately configured on the dedicated RO for reduced capability (redcap) UEs.

Aspect 45 is the method of any of aspects 28 to 44, further comprising: receiving, from the UE, a request to switch a UE capability from a first UE capability to a second UE capability; and transmitting, to the UE, one of an acknowledgement (ACK) or a negative ACK (NACK) based on the received request.

Aspect 46 is the method of any of aspects 28 to 45, where the request is received via one of sounding reference signals (SRS), a physical random access channel (PRACH), a physical uplink control channel (PUCCH), or a physical uplink shared channel (PUSCH).

Aspect 47 is the method of any of aspects 28 to 46, where the one of the ACK or the NACK is transmitted via downlink control information (DCI) or a random access response (RAR).

Aspect 48 is the method of any of aspects 28 to 47, where the request is associated with an updated type of random access channel (RACH) procedure, the updated type of RACH procedure being initiated based on the request.

Aspect 49 is the method of any of aspects 28 to 48, where the request corresponds to a message A (msgA) when the updated type of RACH procedure is a 2-step RACH procedure, and the request corresponds to a message 1 (msg1) when the updated type of RACH procedure is a 4-step RACH procedure.

Aspect 50 is the method of any of aspects 28 to 49, further comprising:
communicating with the UE based on the second UE capability upon transmitting the ACK or based on the first UE capability upon transmitting the NACK, where the second UE capability is a reduced capability compared to the first UE capability.

Aspect 51 is the method of any of aspects 28 to 50, further comprising: transmitting, to the UE, a UE capability reduction instruction via a physical downlink control channel (PDCCH), where the UE capability reduction instruction includes an identifier of the UE and a capability reduction time period, where the request is received within the capability reduction time period.

Aspect 52 is an apparatus for wireless communication including means for implementing a method as in any of aspects 28 to 51.

Aspect 53 is an apparatus for wireless communication including at least one processor coupled to a memory and configured to implement a method as in any of aspects 28 to 51.

Aspect 54 is a computer-readable medium storing computer executable code, where the code when executed by a processor causes the processor to implement a method as in any of aspects 28 to 51.

What is claimed is:
1. An apparatus for wireless communication at a user equipment (UE), comprising:
one or more memories; and
one or more processors coupled to the one or more memories, the one or more processors individually or collectively configured to cause the UE to:
receive, from a base station, at least one synchronization signal block (SSB);
measure a reference signal received power (RSRP) of the at least one SSB;
initiate a random access channel (RACH) procedure based on a measurement of the RSRP of the at least one SSB in relation to a threshold; and
indicate a reduced UE capability of the UE during the RACH procedure on resources dedicated for reduced capability UEs.

2. The apparatus of claim 1, wherein the RACH procedure comprises a 4-step RACH procedure, and the measurement of the RSRP of the at least one SSB is less than the threshold.

3. The apparatus of claim 2, wherein the reduced UE capability is indicated through a preamble in a random access message 1 (msg1).

4. The apparatus of claim 2, wherein the reduced UE capability is indicated through a random access occasion in which a preamble is transmitted, wherein the random access occasion is configured for the reduced capability UEs.

5. The apparatus of claim 4, wherein the random access occasion is a shared random access occasion that is configured for the reduced capability UEs.

6. The apparatus of claim 1, wherein the one or more processors are, individually or collectively, further configured to cause the UE to:
receive system information indicating at least one of an uplink bandwidth part (BWP) or a downlink BWP associated with the reduced capability UEs.

7. The apparatus of claim 6, wherein the one or more processors are, individually or collectively, further configured to cause the UE to:
communicate with the base station based on an indication of the reduced UE capability of the UE and the at least one of the uplink BWP or the downlink BWP associated with the reduced capability UEs.

8. The apparatus of claim 1, wherein the RACH procedure comprises a 2-step RACH procedure, and the RSRP of the at least one SSB is greater than the threshold.

9. The apparatus of claim 8, wherein the reduced UE capability is indicated through a preamble in a random access message 1 (msg1).

10. The apparatus of claim 9, wherein the reduced UE capability is indicated through a random access occasion in which the preamble is transmitted, wherein the random access occasion configured for the reduced capability UEs.

11. The apparatus of claim 10, wherein the random access occasion is a shared random access occasion configured for the reduced capability UEs.

12. The apparatus of claim 1, wherein the reduced UE capability is indicated in at least one of a physical uplink shared channel (PUSCH), a demodulation reference signal (DMRS), a physical uplink control channel (PUCCH), or a physical RACH (PRACH) using the resources dedicated for the reduced capability UEs.

13. The apparatus of claim 1, further comprising at least one transceiver coupled to the one or more processors.

14. A method of wireless communication at a user equipment (UE), comprising:
receiving, from a base station, at least one synchronization signal block (SSB);
measuring a reference signal received power (RSRP) of the at least one SSB;

initiating a random access channel (RACH) procedure based on a measurement of the RSRP of the at least one SSB in relation to a threshold; and indicating a reduced UE capability of the UE during the RACH procedure on resources dedicated for reduced capability UEs.

15. The method of claim 14, wherein the RACH procedure comprises a 4-step RACH procedure, and the measurement of the RSRP of the at least one SSB is less than the threshold.

16. The method of claim 15, wherein the reduced UE capability is indicated through a preamble in a random access message 1 (msg1).

17. The method of claim 15, wherein the reduced UE capability is indicated through a random access occasion in which a preamble is transmitted, wherein the random access occasion is configured for the reduced capability UEs.

18. The method of claim 17, wherein the random access occasion is a shared random access occasion that is configured for the reduced capability UEs.

19. The method of claim 14, further comprising:
receiving system information indicating at least one of an uplink bandwidth part (BWP) or a downlink BWP associated with the reduced capability UEs.

20. The method of claim 19, further comprising:
communicating with the base station based on an indication of the reduced UE capability of the UE and the at least one of the uplink BWP or the downlink BWP associated with the reduced capability UEs.

21. The method of claim 14, wherein the RACH procedure comprises a 2-step RACH procedure, and the RSRP of the at least one SSB is greater than the threshold.

22. The method of claim 21, wherein the reduced UE capability is indicated through a preamble in a random access message 1 (msg1).

23. The method of claim 22, wherein the reduced UE capability is indicated through a random access occasion in which the preamble is transmitted, wherein the random access occasion configured for the reduced capability UEs.

24. The method of claim 23, wherein the random access occasion is a shared random access occasion configured for the reduced capability UEs.

25. The method of claim 14, wherein the reduced UE capability is indicated in at least one of a physical uplink shared channel (PUSCH), a demodulation reference signal (DMRS), a physical uplink control channel (PUCCH), or a physical RACH (PRACH) using the resources dedicated for the reduced capability UEs.

26. An apparatus for wireless communication at a user equipment (UE), comprising:
means for receiving, from a base station, at least one synchronization signal block (SSB);
means for measuring a reference signal received power (RSRP) of the at least one SSB;
means for initiating a random access channel (RACH) procedure based on a measurement of the RSRP of the at least one SSB in relation to a threshold; and
means for indicating a reduced UE capability of the UE during the RACH procedure on resources dedicated for reduced capability UEs.

27. A non-transitory computer-readable medium storing computer executable code at a user equipment (UE), the code when executed by at least one processor causes the UE to:
receive, from a base station, at least one synchronization signal block (SSB);
measure a reference signal received power (RSRP) of the at least one SSB;
initiate a random access channel (RACH) procedure based on a measurement of the RSRP of the at least one SSB in relation to a threshold; and
indicate a reduced UE capability of the UE during the RACH procedure on resources dedicated for reduced capability UEs.

28. The non-transitory computer-readable medium of claim 27, wherein the RACH procedure comprises a 4-step RACH procedure, and the measurement of the RSRP of the at least one SSB is less than the threshold.

29. The non-transitory computer-readable medium of claim 28, wherein the reduced UE capability is indicated through a preamble in a random access message 1 (msg1).

30. The non-transitory computer-readable medium of claim 28, wherein the reduced UE capability is indicated through a random access occasion in which a preamble is transmitted, wherein the random access occasion is configured for the reduced capability UEs.

* * * * *